(12) United States Patent
Chheda et al.

(10) Patent No.: US 8,447,680 B2
(45) Date of Patent: May 21, 2013

(54) BUSINESS TRANSACTION FACILITATION SYSTEM

(75) Inventors: Mayur Dhanj Chheda, Charlotte, NC (US); Jeffrey Addison Grant, Charlotte, NC (US); John Marshall McKeever, Charotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/619,455

(22) Filed: Sep. 14, 2012

(65) Prior Publication Data

US 2013/0013529 A1 Jan. 10, 2013

Related U.S. Application Data

(62) Division of application No. 12/235,216, filed on Sep. 22, 2008.

(60) Provisional application No. 61/057,165, filed on May 29, 2008.

(51) Int. Cl.
*G06Q 40/00* (2006.01)

(52) U.S. Cl.
USPC .......................................................... 705/35

(58) Field of Classification Search
USPC ........................................................... 705/35
See application file for complete search history.

(56) References Cited

U.S. PATENT DOCUMENTS

| | | | |
|---|---|---|---|
| 6,185,683 B1 * | 2/2001 | Ginter et al. | 713/176 |
| 7,143,290 B1 * | 11/2006 | Ginter et al. | 713/176 |
| 7,281,133 B2 * | 10/2007 | Ginter et al. | 713/176 |
| 2004/0091114 A1 * | 5/2004 | Carter et al. | 380/259 |
| 2005/0182956 A1 * | 8/2005 | Ginter et al. | 713/193 |
| 2005/0240771 A1 * | 10/2005 | Ginter et al. | 713/176 |
| 2007/0271463 A1 * | 11/2007 | Ginter et al. | 713/176 |
| 2008/0016361 A1 * | 1/2008 | Ginter et al. | 713/176 |
| 2008/0022100 A1 * | 1/2008 | Ginter et al. | 713/168 |
| 2008/0028455 A1 * | 1/2008 | Hatter et al. | 726/10 |

* cited by examiner

*Primary Examiner* — Lindsay M. Maguire
(74) *Attorney, Agent, or Firm* — Michael A. Springs; Moore & Van Allen, PLLC; Padowithz Alce

(57) ABSTRACT

Embodiments of the present disclosure are directed to methods, systems and computer program products for facilitating a business relationship between a customer and at least one provider. The methods, systems and computer program products allow for a system for conducting business transactions and/or facilitating business relationships wholly electronically via an e-vault system. The e-vault system provides at least one interface for one or more client systems to upload data to and from an storage system via a network.

32 Claims, 32 Drawing Sheets

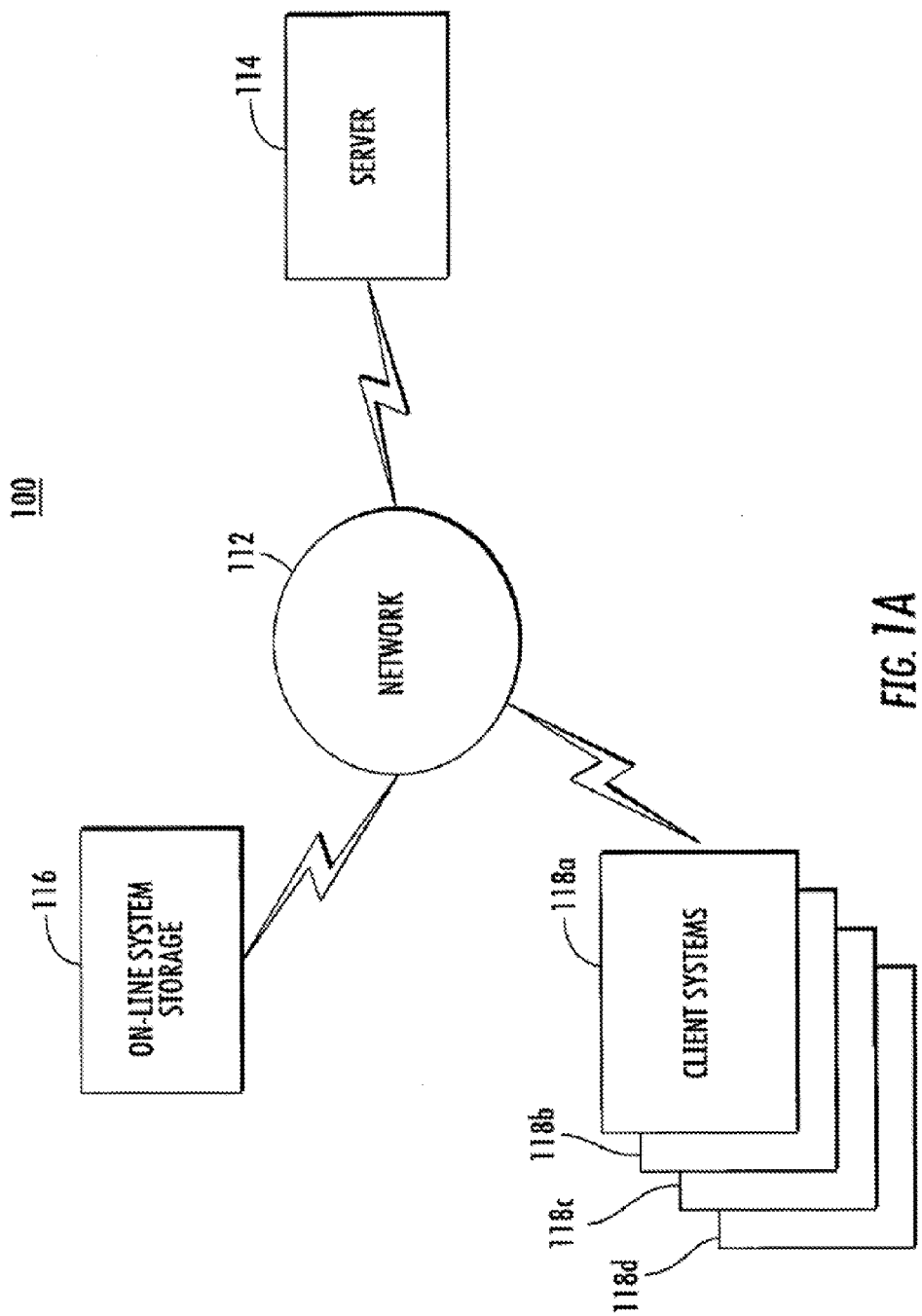

| RELATIONSHIP NAME | ADMINISTRATOR | LAST MODIFIED | COMPLETENESS |
|---|---|---|---|
| CORE PROFILE — 202 | | | |
| ARTICLES OF INCORPORATION — 206a | USER 1 | 02/14/2007 | 100% |
| RELATIONSHIP PROFILES — 206 | | | |
| BANK A — 206b | | | |
| NYC | USER 2 | 03/03/2007 | 100% |
| CORPORATE RESOLUTION | USER 2 | 09/11/2007 | 100% |
| NEW GCI NUMBER REQUEST FORM | USER 2 | 09/11/2007 | 100% |
| TERMS & CONDITIONS AGREEMENT | USER 2 | 03/03/2008 | 50% |
| LETTER OF CREDIT AUTHORIZATION | USER 2 | 05/03/2008 | 80% |
| BANK B — 208 | | | |
| CORPORATE RESOLUTION | USER 2 | 09/11/2007 | 50% |
| SIGNATURE CARDS | USER 2 | 09/11/2007 | 20% |

| JOB ID | TASK ID | ACTION | PERFORMED BY | DATE |
|---|---|---|---|---|
| XXX1 | XXX1 | DOCUMENT PKG INITIATED ~2504 | USER 7 | MAY 23, 2008 1:50PM EDT |
| XXX1 | XXX1 | STATUS: PENDING CUSTOMER REVIEW ~2506 | USER 7 | MAY 23, 2008 1:50PM EDT |
| XXX1 | XXX1 | STATUS: PENDING BANK APPROVAL ~2508 | USER 3 | MAY 23, 2008 1:51PM EDT |
| XXX1 | XXX1 | STATUS: PENDING CUSTOMER SIGNATURE ~2510 | USER 7 | MAY 23, 2008 1:51PM EDT |
| XXX1 | XXX1 | STATUS: SIGNED SEALED AND DELIVERED ~2512 | USER 3 | MAY 23, 2008 1:53PM EDT |

BUSINESS TRANSACTION FACILITATION SYSTEM

CROSS-REFERENCE TO RELATED APPLICATION

This application is a divisional of co-pending patent application Ser. No. 12/235,216, filed Sep. 22, 2008 which in turn claims priority from provisional patent application Ser. No. 61/057,165, filed May 29, 2008, the entire disclosure of each is incorporated herein by reference.

INTRODUCTION

In the present environment, companies engage with others with whom they have business relationships, such as financial institutions, in a paper-based environment. For example, companies must periodically provide various forms of corporate information to various financial institutions, such as banks, with which they transact regarding corporate structure, corporate agreements, financial statement, corporate minutes, shareholder agreements, etc. Further, businesses need to review, validate and sign multiple documents prepared by banks to fulfill regulatory requirements. Companies indicate that the amount of paperwork and multiple requests for the same documents can be daunting. Further, companies and banks indicate that employee turnover contributes to administrative tasks required to give new employees authorization to work with third party vendors, banks, companies and the like.

SUMMARY

The present invention provides systems, methods, and computer programs products for facilitating a networked banking profile that allows a company to upload to a database various corporate documents and other information. The systems, methods, and computer program products provide an interface by which a company may upload the various documents or enter various corporate information. The systems, methods, and computer program products provide an interface by which a company may update, manage, and administer the uploaded documents and entered corporate information. The systems, methods, and computer program products of the present invention also provide interfaces by which institutions and individuals with which the company interacts may access the uploaded corporate documents and entered information for review and validation. As such, the company need only provide and/or update the information to one location. The information and documentation can then be reviewed and validated by various institutions, companies, and individuals with which the company interacts.

The systems, methods, and computer program products of the present invention allows a business to maintain, manage, and administer data and documents in a centralized repository that can be shared with multiple businesses and entities with which the company interacts. The business can create and manage its profile and add new companies and individuals that may access the electronic information in a secure, electronic system.

The systems, methods, and computer program products may use image-recognition processes to determine various data fields of information from the scanned documents. The systems, methods, and computer program products may also provide various forms or other electronic interfaces by which the company enters various data. This data can be stored in the database along with the scanned documents. This stored data may be accessed by companies and individuals with whom the business interacts. The data may be used by the various companies and individuals to analyze the company, such as determine credit information, perform risk assessments, etc.

The data may be used to facilitate paperless or semi-paperless transactions. For example, the data could be used to create various forms to be used in a business transaction with the company. For example, the data could be used to create various documents needed to perform a loan transaction between a financial institution and the company.

The systems, methods, and computer program products may be further capable of creating of an electronic transaction portal for facilitating an electronic business transaction. In this embodiment, data relating to a company may be uploaded and made available to other companies and individuals with whom the company interacts, as described above. When the company wishes to conduct a possible electronic transaction, the company may create a specific portal or folder for use in communication of documents and information on-line. The company will designate various third-party companies and/or individuals that may have access to the portal or folder. For example, the company may designate one or more financial institutions that may access the portal. The company could also provide access to other companies or individuals that are part of the transaction, such as lawyers, accountants, etc. The financial institution(s) involved in the transaction may also grant access to various other companies or individuals that are part of the transaction, such as its lawyers, accountants, title company, etc. The systems, methods, and computer program products may provide different security levels to allow for different levels of access to information. For example, the systems, methods, and computer program products may enable the company to designate specific access rights to the various outside companies involved in the transaction. These specific access rights would enable the outside companies to only access necessary information.

The systems, methods, and computer program products allow for creation and uploading of various documents and other information pertinent to the transaction. The documents and information is entered into the portal or folder. The systems, methods, and computer program products are capable of posting the documents and information to the portal and making it available to authorized entities associated with the transaction. The systems, methods, and computer program products may also allow for routing of documents to others involved in the transaction, similar to an email routing system. The systems, methods, and computer program products allow for review of the documents and information by the various entities. It may also allow the entities to update the documents and information, validate the information, etc. The systems, methods, and computer program products may also allow for electronic signature or other forms of electronic acceptance of documents and transaction terms to thereby complete an electronic transaction. The systems, methods, and computer program products may also allow for digital authentication of the documents. The systems, methods, and computer program products may further allow for post-closing processing, such as routing of final document, performing electronic recordation, generating reports, transferring funds, etc. associated with the transaction.

BRIEF DESCRIPTION OF THE DRAWINGS

FIG. 1A is a block schematic of an example of a system of a business transaction facilitation system in accordance with an embodiment of the present invention.

FIGS. 2-14 and FIGS. 16-31 illustrate a graphical user interface of exemplary portions of a business transaction facilitation system in accordance with various embodiments of the present invention.

DESCRIPTION

Figure 1B:
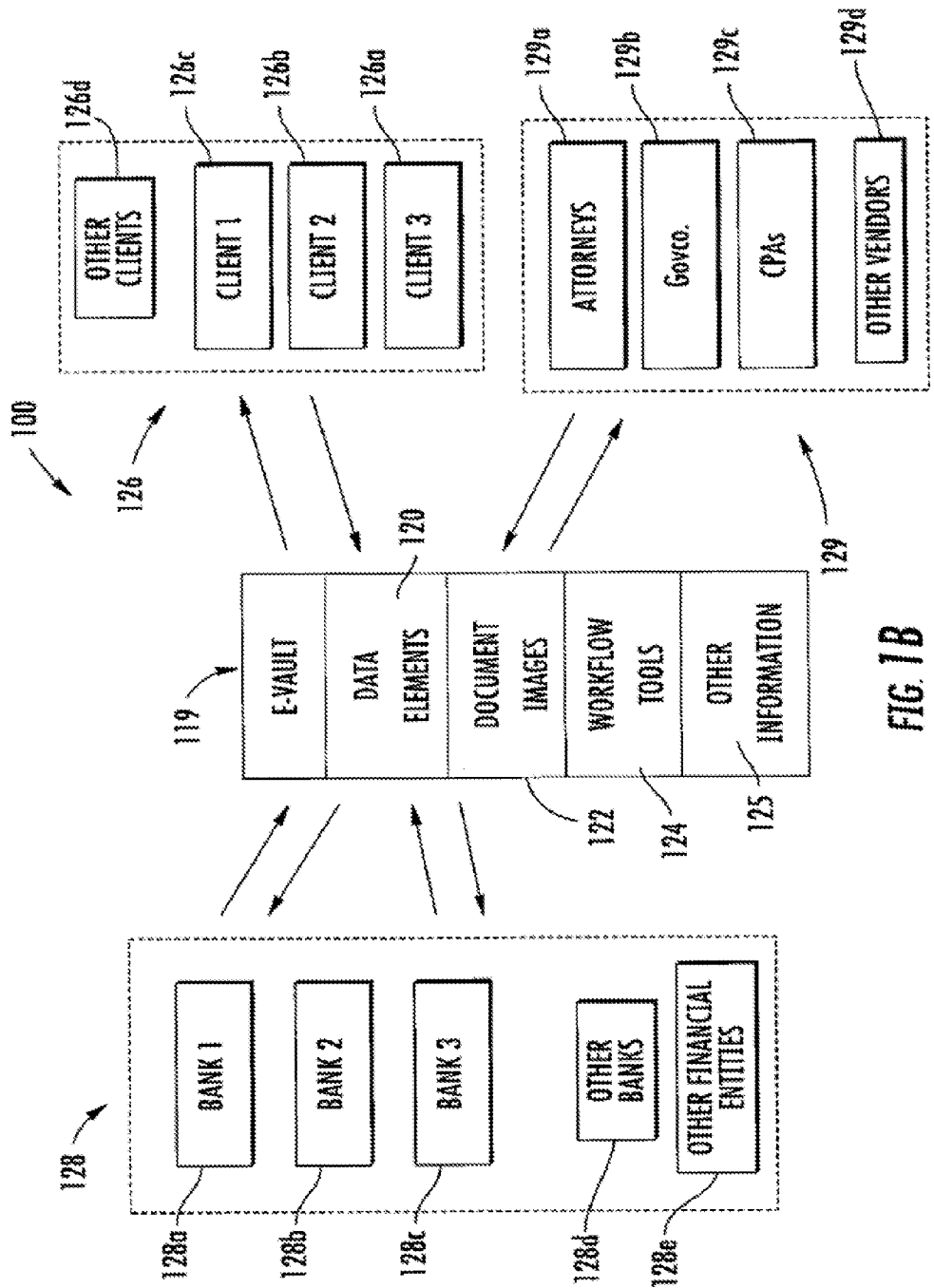
FIG. 1B is a block schematic of an example of a system of a business transaction facilitation system in accordance with another embodiment of the present invention.

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, embodiments of the present invention may be embodied as a method, system, computer program product, or a combination of the foregoing. Accordingly, embodiments of the present invention may take the form of an entirely hardware embodiment, an entirely software embodiment (including firmware, resident software, micro-code, etc.) or an embodiment combining software and hardware aspects that may generally be referred to herein as a "system." Furthermore, other embodiments of the present invention may take the form of a computer program product on a computer-readable medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

Some embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out embodiments of the invention.

In general terms, embodiments of the present invention provide systems, methods, and computer program products for facilitating creation of electronic banking profiles of a business or individual for use in interacting, reporting and transacting with other companies and/or individuals. An individual or business may create an electronic profile containing various information related to either the individual or business. In the context of a business, the electronic information could be various documents regarding corporate structure, corporate constitutional documents, corporate agreements, financial statements, corporate minutes, shareholder agreements, compliance certifications, tax forms, client reporting, investor information, client ownership structure and the like. These documents and/or data can then be made available to third parties designated by the individual or business with whom they interact. Such third parties may be any entity such as select individuals, lawyers, accountants, governmental entities, vendors, banks, entities in the banking industry, or any other entity which may be interested in receiving the corporate documents and/or data. In one embodiment, the documents are also available to select internal members of the corporation or owners of the documents. The documents may be secured by various means such as password protection, encryption, biometrics, electronics token, and the like or may simply be open to the public or anyone who accesses the electronic profile, as desired by the owners of the electronic profile. The documents and/or data can be easily updated to the electronic profile and made available on-line for review by the designated third parties and/or, select internal members and/or any other desired entity.

In addition, the systems, methods, and computer program products may provide an system for generation, routing, access, approval, and the like of various documents and/or information needed to perform a paperless or semi-paperless transaction. In the event that information is needed for the paperless transaction, information may be manually entered or may be automatically entered by retrieving information that has been previously entered. An example of a paperless transaction is described below with regard to FIGS. 9-26.

FIG. 1a is generalized block diagram according to one embodiment of the present invention. As illustrated in this example embodiment, a system 100 comprises a network 112, such as a LAN, WAN, Internet, intra-net, and other data transfer connections. Although the illustrated embodiments show that the system 100 employs a network 112, it should be understood that the system 100 could be employed without a network 112 such that the system 100 may be solely operable on a single computer system.

Connected to the network 112 is a server 114 or series of servers that maintain a storage system 116, such as a database, data warehouse, and the like. The storage system 116 may include various data, records, and documents associated with one or more businesses or individuals. The storage system 116 may be housed on any computer readable storage medium, such as hard drives, flash drives, compact discs, servers, and any other medium that is capable of storing electronic information, data, records, documents and the like. The information, data, records, document and the like may be automatically or manually stored in or retrieved from the storage system 116.

Connected to the server 114 via the network 112 are one or more client systems 118 for accessing the server 114 to manage corporate business, data, transactions and the like. For example, with reference to FIG. 1a, a first client system 118a may be operated by a business or individual for uploading various documents and other data and facilitating transactions regarding the business or individual, and for obtaining and/or receiving information, data and the like from the first client system 118a. Other client systems 118b-d may be operated by various other businesses and/or individuals that interact with the business or individual 118a associated with the stored documents and/or data, whereby these various businesses or individuals may gain access to the stored documents and/or data. The software for such system 100 may be stored and/or run from one or more of the client systems 118a-d.

As an example, a business or individual may access the server 114 via the first client system 118a. The business, individual or third party may then upload various documents and/or information related to the business or individual for storage in the storage system 116. For example, the user may scan and upload various corporate documents, such as corporate bi-laws, corporate structure information, corporate financial statements, corporate contact information, information regarding individuals within the corporation having authority to enter into transactions and any limitations associated therewith. Also, other parties 118b-d or other third parties may require information about the business 118a and thus, information, data and the like may be downloaded from the first client system 118a and routed to the appropriate location. For example, a third party may require a business or individual 118a to fill out a form and after the business 118a has filled out the form, the form may be uploaded to the storage system 116 of the system 100, where the form is then downloadable to the third party. In one embodiment, the first client system 118a may recognize what information is being requested by the third party and transfer the information from the storage system 116 to the third party or automatically populate the form for the business 118a.

Embodiments of the systems, methods, and computer program products are capable of storing the various documents and/or data in the storage system 116. Also, embodiments of the systems, methods, and computer program products may use various data protection and security measures to secure the information and limit access. For example, various login information, security IDs, biometrics, electronic verification devices, and other security measures may be employed to authenticate an entity to the system 100. Further, for security purposes, only a limited amount of authorized entities may even have access to the system 116. Additionally, the system 100 may allow encryption of any data associated with the system 116 and/or any transmission of data to or from any components of the system 116.

FIG. 1b is a block diagram of the system 100 according to an embodiment of the present invention. FIG. 1b illustrates an exemplary e-vault storage system 100 containing data elements 120, document images 122, work flow tools 124, software, and the like. The e-vault system 119 is a centralized system that is in two-way communication with one or more clients, 126a-d, one or more financial institutions 128 (such as banks 128a-d or other financial entities 128e), and third-party vendors 129 (such as attorneys 129a, government entities 129b, accountants 129c, and/or other vendors or other entities 129d). For example, the clients 126, financial institutions 128, and third-party vendors 129 may access the workflow tools 124 to, among other things, update, transfer, manage, and administer the data elements 120 and document images 122 stored on the storage system 116.

For example, with reference to FIG. 1a, a first client system 118a may be operated by a business or individual for uploading various documents, data, and e-vault system information 120, 122, and 124 regarding the business or individual, and for obtaining and/or receiving information, data, e-vault storage system information 120, 122, and 124 from the first client system 118a. Other client systems 118b-d may be operated by various other businesses and/or individuals that interact with the business or individual 118a associated with the stored documents and/or data, whereby these various businesses or individuals may gain access to the stored documents and/or data. The software for the banking system 100 may be stored and/or run from one or more of the client systems 118a-d, a server 114, or any other computer.

As an example, a business or individual may access the server 114 via the first client system 118a. The business or individual may then upload various documents and/or information related to the business or individual for storage in the storage system 116. For example, the user may scan and upload various corporate documents, such as corporate bi-laws, corporate structure information, corporate financial statements, corporate contact information, information regarding individuals within the corporation having authority to enter into transactions and any limitations associated therewith. Also, a client 126, financial entity 128, any other third-party entity 129 or any other entity may request or require information about the business or individual and thus, information, data and the like may be downloaded from the first client system 118a which may then route that information to the appropriate location, such as to client 126, financial entity 128, any other third-party entity 129 and the like. For example, a third party entity 129 may wish to provide a business or individual with a form to fill out and such information may have been stored on the storage system 116 (or stored on any other system, such as a computer owned and managed by the business or individual). The first client system 118*a* may recognize that the information desired by the third party entity 129 is located on the storage system 116 (or any other system, such as a computer owned and managed by the business or individual) and transfer the information to the third party entity 129 and/or transfer the information to the form so that the form will be automatically filled in with such information.

Embodiments of the systems, methods, and computer program products may be capable of storing the various documents and/or data in the storage system 116. Embodiments of the systems, methods, and computer program products may use various data protection and security measures to secure the information and limit access. For example, various login information, security IDs, biometrics, electronic verification devices, and other security measures may be employed to authenticate an entity to the system 100. In one embodiment, for security purposes, only a limited amount of authorized entities may even have access to the system 100. Further, the system 100 may allow encryption of any data associated with the system 100 and/or any transmission of data to or from any components of the system 100.

Embodiments of the present invention may make the documents and/or data available to third parties 118*b-d* for access and viewing. As illustrated in FIG. 2, the system 100 includes a core profile 202. In one embodiment, the core profile 202 of a business or individual 118*a* includes basic documents, data and information about the business or individual 118*a* that is needed for conducting basic transactions with various entities, such as financial institutions, accounting firms, legal firms, and other entities. The core profile information, documents, and data about a business 118*a* may be uploaded to the storage system 116 by any authorized person of the business 118*a*. The core profile 202 may be presented to the authorized personnel of the system 100, or other authorized third parties by an interface. For example, FIG. 2 illustrates a graphical user interface 200 that may be presented to a user of the system 100. As illustrated, the interface 200 may include a core profile 202 that shows that a listing of various corporate documents (such as an "Articles of" Incorporation of document 204) and data associated with the user's business that have been uploaded to the system 100.

The system interface 200 may also list various relationship profiles 206 and 208, which may be profiles of any third party or any other entity. For example, a relationship profile may be established for each of the various relationships that the business 118*a* has with the third-parties 118*b-d* or other entities. For example, the relationship profiles shown in FIG. 2 are with Bank "A" 206 and Bank "B" 208. Although two relationship profiles 206, 208 are shown, it should be understood that any amount of relationship profiles may be included in the interface 200. In one embodiment, any entity may have a relationship profile added to the system 100, including any current or potential business relationships. Under each relationship profile 206, 208, various documents 206*a-e*, 208*a-b* may be associated with, and/or specific to, the relationship. As illustrated, both the business 118*a* and various other third-parties 118*b-d* may access some or all of the documents 204, 206*a-e*, 208*a-b* and data within some or all of the relationship profiles, and view and possibly update the documents and data based on security clearance and read/write rights.

As illustrated, embodiments of the systems, methods, and computer program products may provide various status indications to one or more users of the interface 200. The status indications 210, 212, 214, 216 may be provided in a status section 218 of the interface 200, as illustrated in FIG. 2 and may provide information regarding the status of various profiles 202, 206, 208, tasks or other indicators associated with the business or individual 118*a*. Each status indication 210, 212, 214, 216 may indicate that the business or individual 118*a* is required to upload a certain amount of requested data or information to meet various needs of the clients 26, financial institutions 28, third party entities 29 or any other entity 118*b-d* with whom they transact. Thus, the system 100 may provide various levels of completeness of each profile 202, 206, 208 as a part of the status section 218. For example, the system 100 may provide a level of completeness with respect to the core profile 202 of the business 118*a* and with respect to each relationship profile 206, 208, e.g., each relationship/transaction the business 118*a* has with third parties.

For example, with regard to the core profile status indication 210, the system 100 may indicate that the business or individual 118*a* is required to upload requested documents or data to meet various needs of the clients 126, financial institutions 128, third party entities 129 or any other entity 118*b-d* with whom they transact. As such, the system 100 may provide the level of completeness for the core profile 202 via the status indication 210 of the interface 200. As shown in FIG. 2, various status indications, such as "Core Profile: 90%" 210, "Bank A Profile: 70%" 212, "Bank B Profile: 50%" 214, and "Task Profile: 20%" 216, are shown in the section 218 labeled "Status" 220 on the left hand side of the interface 200. These status indications 210, 212, 214, and 216 may be modified or deleted and any other status indications (not shown) may be added. The level of completeness may be illustrated by a percentage, a bar graph, and the like. One or more status indication may be defined, modified, added or deleted, as shown in FIG. 2.

In one embodiment, the level of completeness for a specific profile is the ratio of the amount of data that is required to be entered to complete the profile over the total amount of data entry required for the profile, regardless of the amount of forms, documents, and the like that need information provided to them. For example, if an amount of data that is required to be inputted to complete the profile is equal to one-half of the total amount of required data for the a complete profile, the level of completeness will be 50% because 50% of the data has not yet been inputted into the system.

In another embodiment, the level of completeness may only refer to the amount of new previously unentered data and/or data that is required (versus optional data) to complete the profile. For example, if basic information has previously been entered into the system 100 and this basic information is also required for data that has not yet been entered into forms requiring completion, then this repetitious basic information that is needed for the incomplete forms will not count against the level of completeness. To illustrate this point, if 20% of the total required information remains to complete the profile and if only 10% of this required information is new and previously-unentered information, then the level of completeness will be 90%, instead of 80%. As illustrated in FIG. 2, the level of completeness for the core profile is at 90%, Bank "A" Profile at 70% and Bank "B" Profile at 50%, which means that 10% of the total required data for the core profile has not yet been entered, 30% of the total required data to complete the Bank "A" Profile has not yet been entered, and 50% of the total required data to complete the Bank "B" Profile has not yet been entered into the system 100, respectively. This provides an amount of actual non-repetitious data entry that is required by the user to complete the respective profile.

In another embodiment, the level of completeness may be a ratio of the amount of forms or the number of items requiring data entry over the total amount of forms required. It should be understood that the status indications and the level of completeness may be calculated in other ways and may represent other status information about the core profile, such as status of incompleteness, status of how many transactions have been previously performed with the associated business relationship, the percentage of satisfaction the business has with the business relationship, any combinations thereof or any other information associated with the business relationship.

Continuing with FIG. 2, the status section 218 of the interface 200 also includes a task profile status indication 216. The task profile status indication 216 gives a level of completeness of how many tasks remain to be completed. The level of completeness for the task profile is the ratio of the amount of incomplete tasks or activities, such as executing a document, approving a request, and the like, over the total amount of tasks or activities required. Typically, the level of completeness for the task profile is calculated per document. As shown in the exemplary illustration of FIG. 2, the level of completeness for the task profile status indication 216 is at 20% and thus, 80% of the documents, forms or other items still require some sort of action. The examples shown above indicate that the level of completeness may relate to the number of tasks, activities or actions required for completing the documents, forms, etc.; however, the level of completeness for the task profile status indication 216 may also include optional action items as well as required action items. Additionally, in one embodiment, the task profile status indication 216 may be calculated as a ratio of the amount of incomplete work left to do over the total amount of work required to complete the task, as desired by the customer.

The system 100 may also provide a level of completeness via a status indication (not shown) for a particular, individual transaction. For example, if the business 118a is a applying for a new letter of credit with a financial institution 118b, the system 100 may indicate the level of completeness relating to the amount of task left to complete a single transaction over the total amount of tasks required for the full transaction.

The interface 200 may also provide information regarding administrators for various information and/or options relating to administrative tasks 222 and provide historical information and/or options 224 regarding transactional history and updates made to data in the database. The administrative information may relate to various administrative privileges, entitlements, login passwords, profile creation/modification and other administrative settings and controls. An example of administrative information is discussed below with respect to FIG. 5. The historical information may include various information related to transaction histories, data transfer histories, histories of administrative changes, and the like associated with the business information and transactions. Transaction history information is further described below with respect to FIG. 25.

As can be seen, embodiments of the systems, methods, and computer program products provide a convenient means for electronically uploading and updating information. The business or individual 118a may simply upload and/or update various documents and data, and make such documents and data available to various clients 26, financial institutions 128, third-party entities 118b-d or other entities with which the business 118a interacts, without having to duplicate the process several times over for each entity 118b-d. As previously mentioned, the business 118a may set privileges for various third-parties so that only a limited amount of third-parties, a list of specific third-parties or any third party may view such information. These settings may be set up and modified in the administrative information area 222 of the interface.

Figure 3:
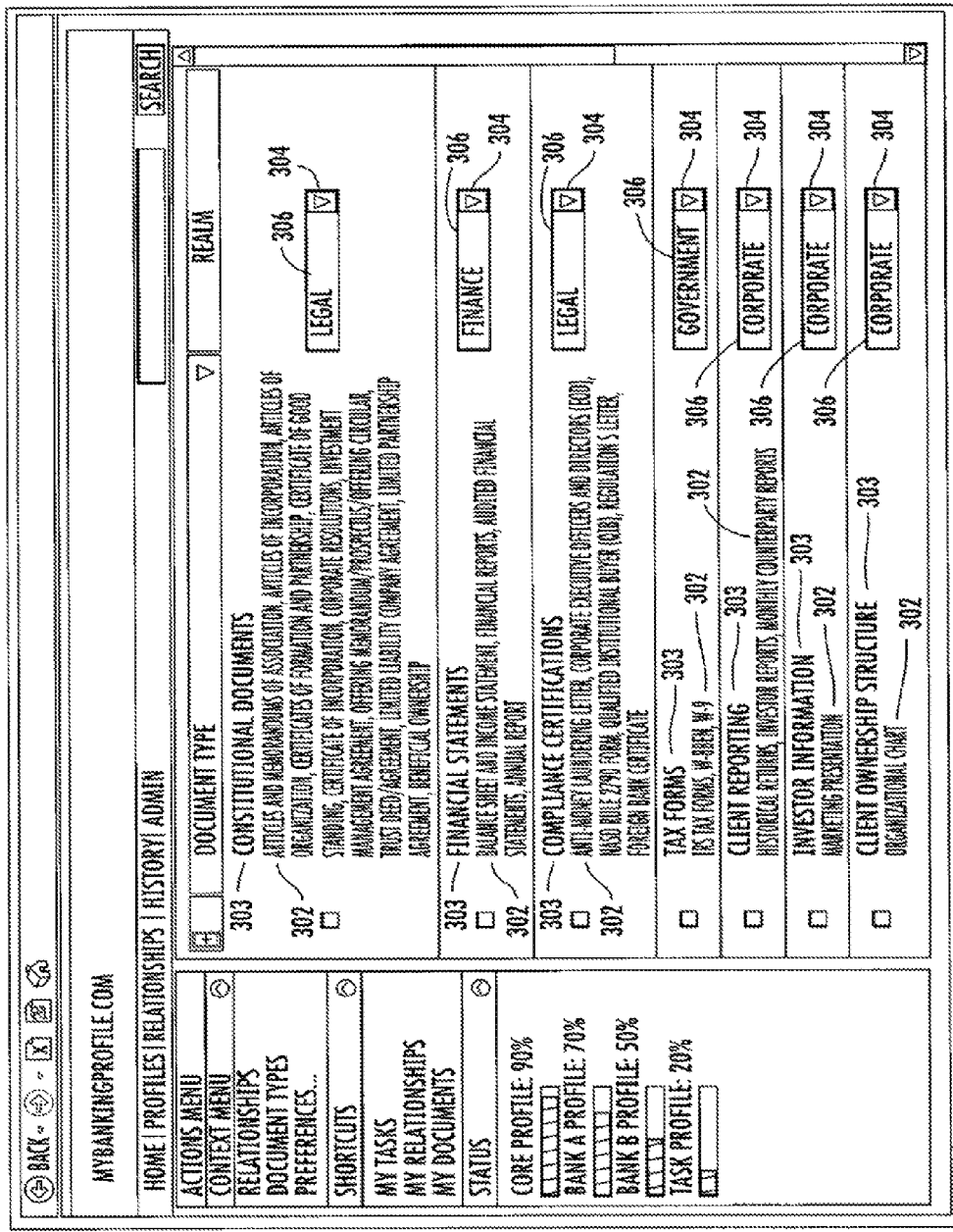

FIG. 3 illustrates an interface 300 listing various corporate documents 302 that have been uploaded by a business or individual 118a. For example, the documents 302 listed in FIG. 3 may be located in the core profile 202, and may be accessed from time to time when, for example, necessary to complete a transaction, maintain a relationship or for other business-related purposes. The interface 300 illustrated in FIG. 3 also provides drop-down menus 304 that enable the business 118a to designate a 'Realm' category 306 for each document type 303, which may include one or more documents 302 associated with a certain document category. For example, the business 118a may categorize a document type 303 as having a 'Realm' designation 306 of 'Legal,' 'Finance,' 'Corporate,' 'Government,' or other similar categories. This 'Realm' designation 306 may be used to when granting varying access rights to the documents 302 to clients 126, financial institutions 128, third-party entities 129, or other entities 118b-d. For example, accountants 129c may be set to only have access to documents having a 'Finance' and 'Government' realm designation. 'Realm' designations 306 may also be used to index the documents and data, and thereby facilitate searching. As shown in FIG. 3, the document types are grouped into various categories, such as constitutional documents, financial statements, compliance certifications, tax forms, client reporting, and client ownership structure. These document type categories are not limiting and other document types may be included. In one embodiment, each of the document type groupings may be expanded (e.g. by clicking the check-box beside of each grouping) so that each individual document within the grouping may have its own 'Realm' designation 306. The 'Realm' designations 306 may associate the 'Realm' designation 306 to one or more documents in the associated document type and may be stored in the storage system 116. In one embodiment, each individual document 302 in the document type list 303, rather than the document type 303, may have a 'Realm' designation 306. It should be understood that each document type 303 or document 302 may have more than one 'Realm' designation 306.

Figure 4:
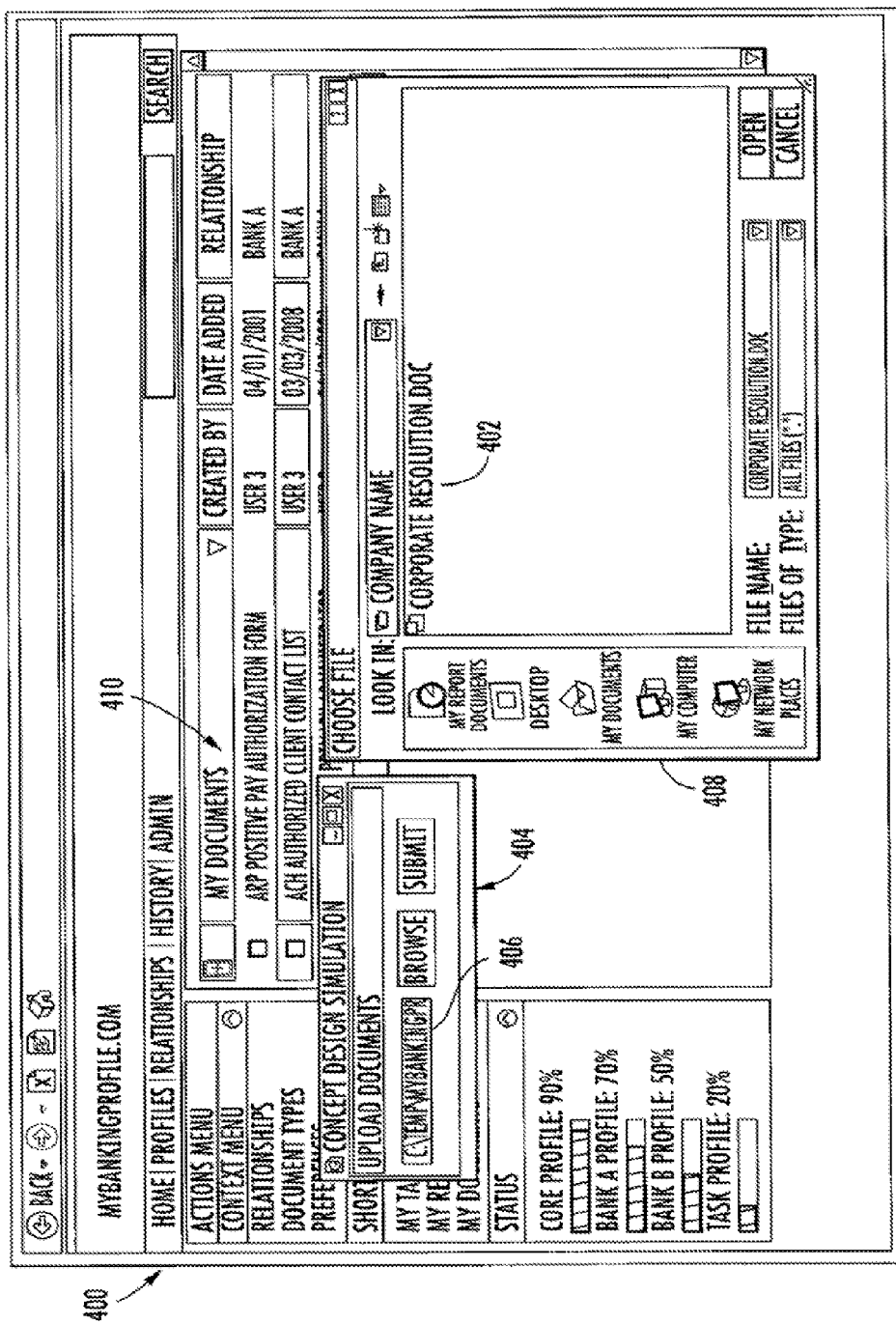

FIG. 4 illustrates an upload interface 400 for uploading documents. When desired, a business 118a may upload, for example, a document 402 to the core profile 202. To accomplish this, the user may click a link, drop-down menu, check box or other option indicator with a mouse pointer to indicate the user's intention of uploading a specific document. In one embodiment, the interface may have a document listing (not shown) from which the user may select to indicate what document the user will be uploading and/or a document choice designated as "other" in which allows the user to specify the document being uploaded in the event the uploaded document is not in the document listing. An option may be provided to the user to select which profile(s) the document is to be associated with, such as the core profile, relationship profile or another profile. In another embodiment, the system may automatically determine what the document type is and/or which profile the document should be uploaded to based on recognition software. Regardless, to upload the file, an interface is provided that allows the user to select the file from the user's electronic device, such as the user's computer, PDA, cell phone or other electronic device, by allowing the user to browse his electronic device and/or manually type in the address where the file or files are located. After the files have been selected to be uploaded, the user can confirm these are the correct files to be uploaded and then upload the files by, for example, clicking a "Submit" button, as shown in FIG. 4. At this point at least one document is transferred via an electronic connection, such as HTTP, FTP, MMS, SMS, SOAP, and the like, over the network 112 to the server. The server receives the information, determines which client systems 118 to associate the data with and accordingly, stores the data in the storage system. Thereafter, when the user views his business profile, the profile is updated to reflect the updated document and/or data. To upload a document 402, the user enters an indication to upload a file, such as clicking a link, selecting an option from a drop down menu, etc. After providing an indication to upload a document 402 to the system 100, a browser or window 404 may be presented to the user to enter or select the document 402 to be uploaded. The document address 406 may be manually entered or selected by browsing a computer or network via another browser or window 408. After selecting the document 402, the user may submit the document 402 to the system 100, which will electronically submit the document 402 to the system 100 over a network. The document 402 may be saved in the storage system 116 under the appropriate profile (core profile 202, relationship profile 206, 208, my document profile 410, and the like) and the system's interfaces will be updated accordingly. In one embodiment, any entity connected to the system 100 may upload documents to the system 100. In another embodiment, only authorized entities are allowed to upload documents to the system 100.

Scenario 1

Figure 5:
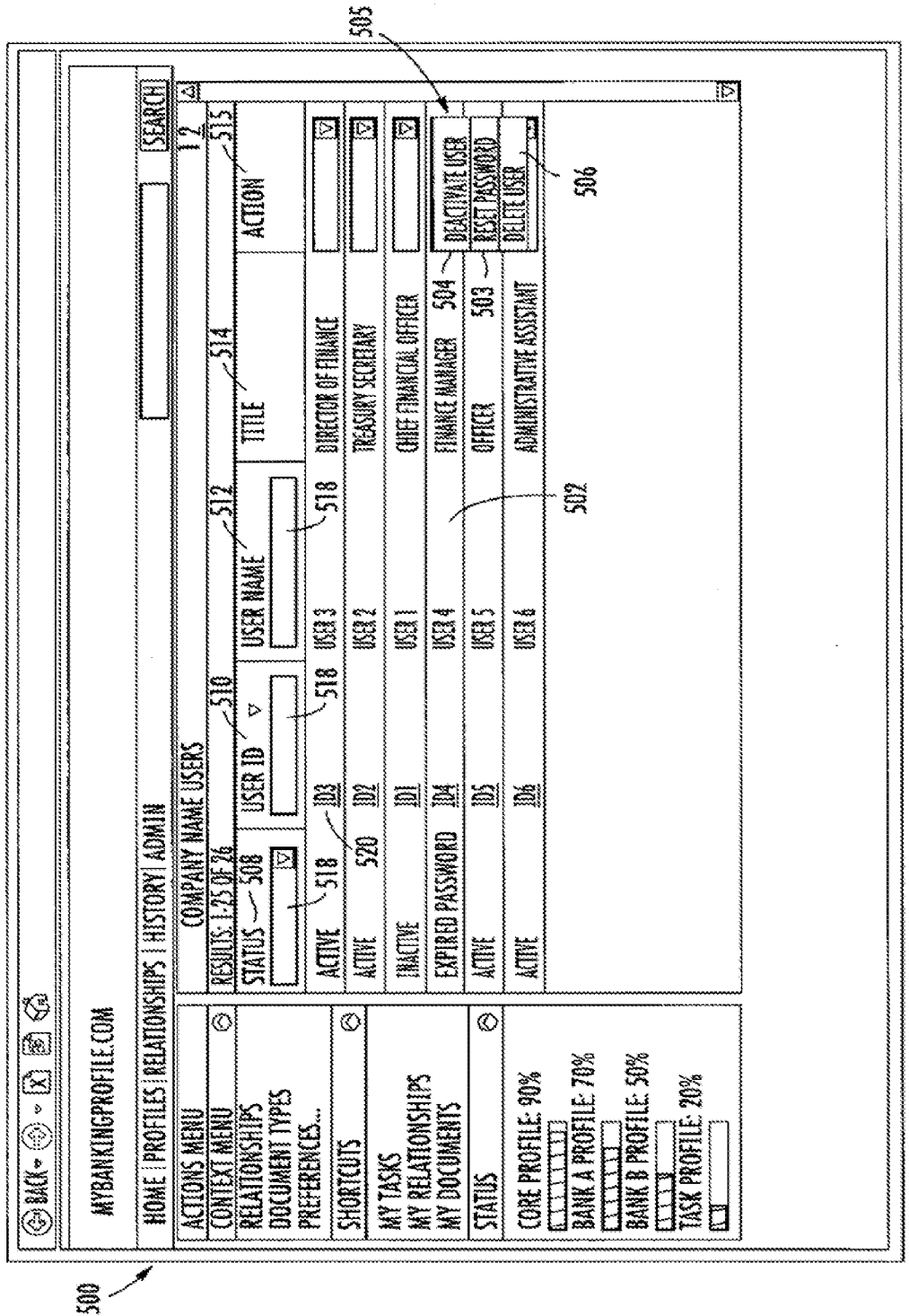

FIGS. 5-8 illustrate a series of steps performed by a business or individual 118a to alter information regarding individuals having authorization to contract on behalf of the business or individual 118a. This action may be performed in the system via a graphical interface 500. As shown in FIG. 5, the graphical interface 500 may provide various information about each user, such as the user status 508, user ID 510, user name 512, user position title 514, and the permissions action 515. An authorized administrator may take various actions, such as reset password 503, deactivate user 504, delete user 506, etc., via the permissions actions option. For example, in FIG. 5, an authorized individual "User" 502, whose password has expired, may access the system 100 via the illustrated interface 500 (or the business 118a may access the system 100 on behalf of User 502) to reset his password 503 via, e.g. a drop down box 504. The authorized administrator may also use the illustrated interface 500 to remove User's access rights by either deactivating his access rights 505 or deleting him 506 from the list of authorized users. The illustrated interface 500 in FIG. 5 may have any form and any displayed information in addition to user status 508, user ID 510, user name 512, title 514 and action 515. A search tool 518 may be included in each category 508, 510, 512 to allow a user to search for a user under the specified parameters 508, 510, 512.

Figure 6:
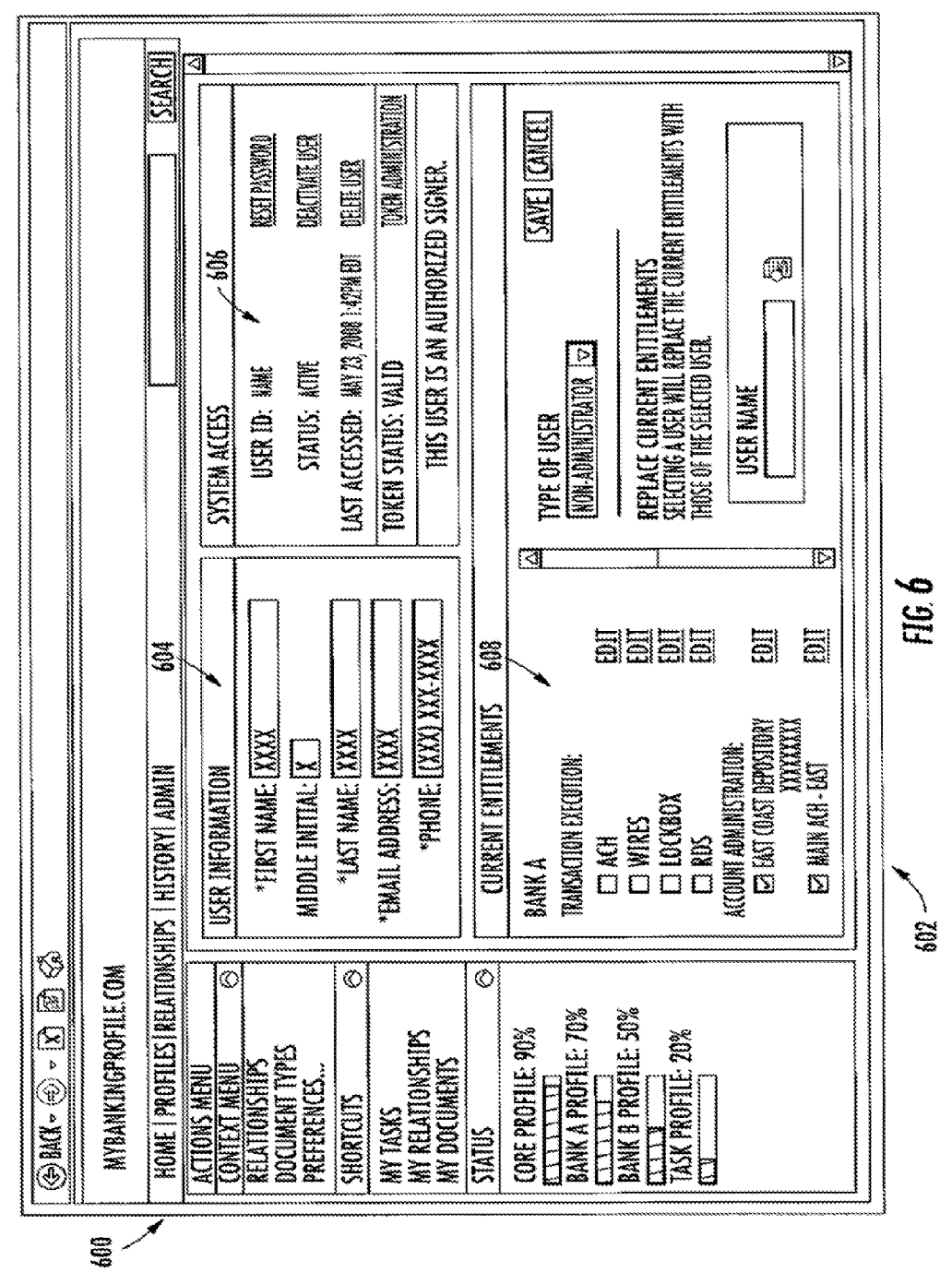

The interface 600 illustrated in FIG. 6 provides an easy way to edit a particular user profile. To view and/or modify an individual's profile, the user may simply bring up an individual's profile 602 by, for example, clicking on the user's ID 510, which is shown as a hyperlink in FIG. 5. For example, by clicking the user ID "ID3" 520, the profile for "User3" 602 is displayed in FIG. 6. Thereafter, various information may be modified or updated in the profile 602, such as the user information 604, system access information 606, current entitlements 608, and other information assigned to the individual. In one embodiment, this interface 600 is also the same interface presented to create a new user profile when a user selects an option to create a new profile.

With an individual's profile 602, the interface 600 also allows for a user to change entitlements 608 from one individual or employee to another individual or employee. Entitlements 608 may include authorization to work with a third party entity and/or accounts with a third-party entity. For example, an officer of business 118a may have current entitlements 608 to work on 100 accounts with Bank "A", while other employees of the company may not be authorized to work with these accounts. In the event that the officer changes job positions or companies, the company will need to replace the current entitlements 608 from the old officer to the new officer so that the new officer has the same entitlements as the old officer.

The interface 600 of the system 100 may be used to change the entitlements 608 of various users by selecting from a list of possible entitlements (not shown) or by transferring entitlements from one user to another. For example, if User3 were to replace User5 as the employee responsible for executing certain transactions for Bank "A", the illustrated interface 600 may be utilized to transfer User5's entitlements to User3 so that User3 is authorized to work with Bank "A" and User5 is not.

Figure 7:
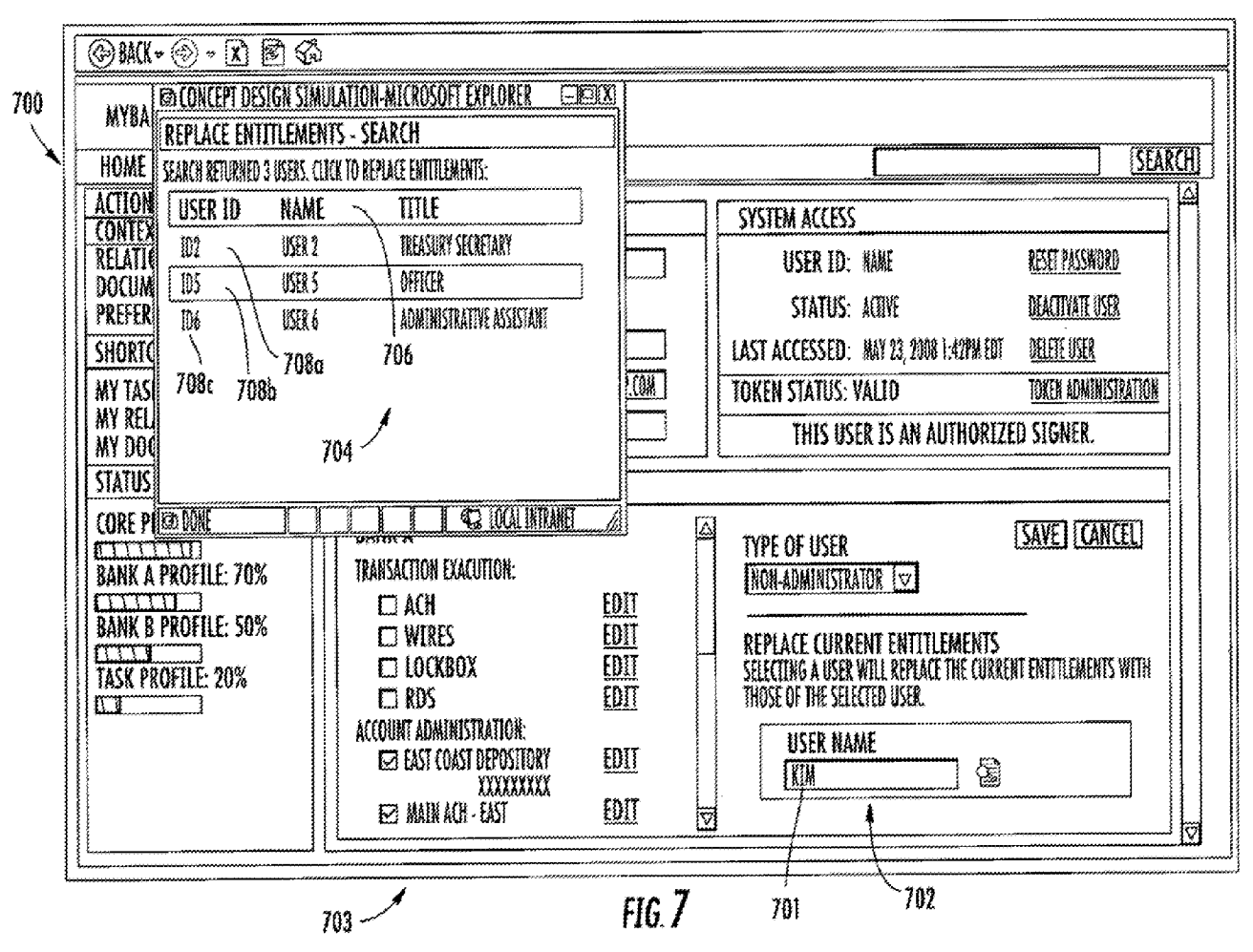
Figure 8:
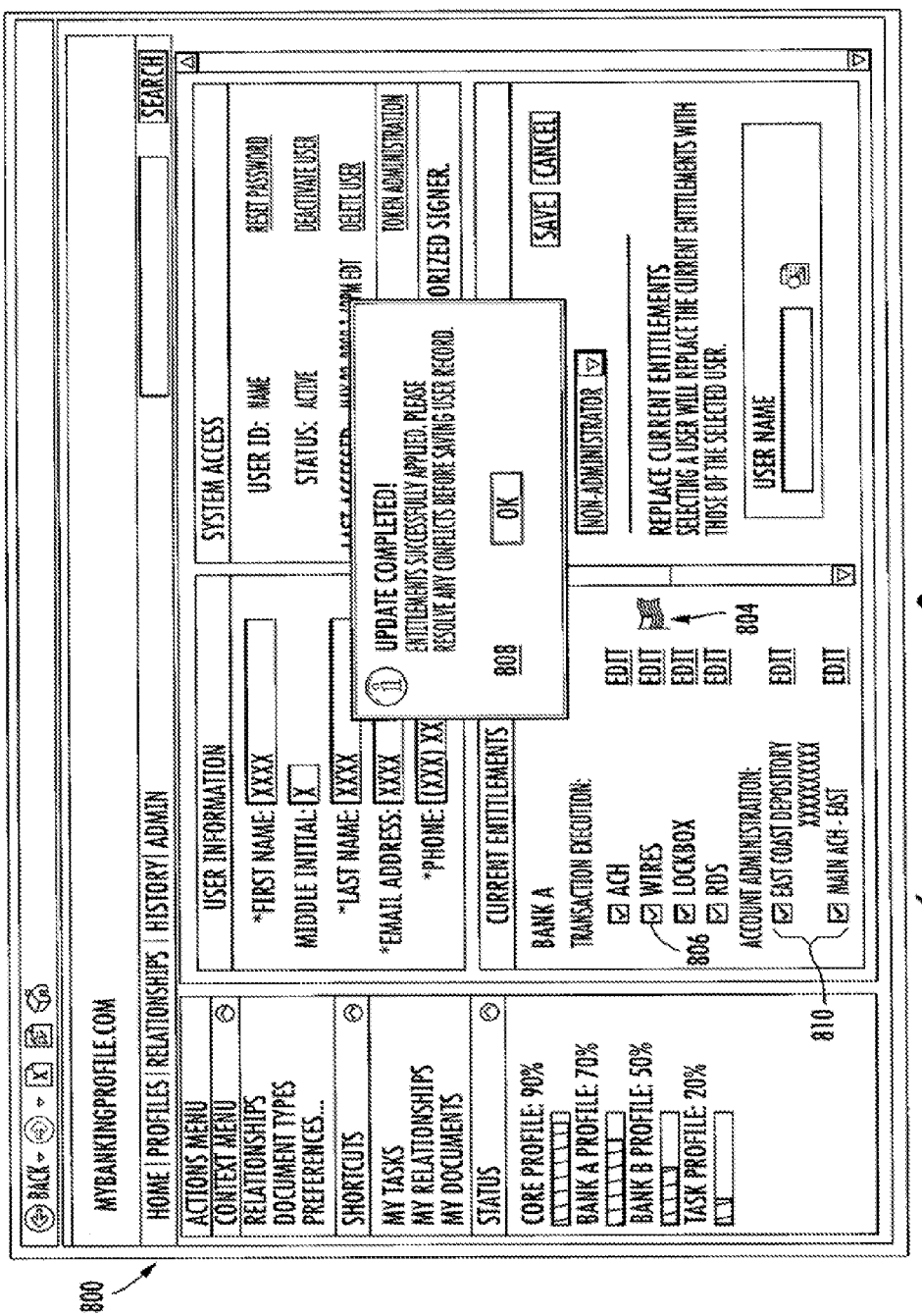

As shown in the illustrative embodiment of FIG. 7, to replace User3' entitlements 608 with User5's entitlements, an administrator may access the user profile for User3 703 by first gaining access to User3's account, such as by clicking on the hyperlink 520 associated with User3's account. As shown in FIG. 7, the administrator may locate User5's profile by, for example, typing the user name, or 'User5' 701, in the 'Replace Current Entitlements' search engine 610. The system 100 will return a list of user profiles 704 having the user name, or 'User5,' the name field 706. The administrator may then select the appropriate user profile 708a-c and the system 100 will transfer the entitlements associated with the selected user profile 708b to User3's profile 802, as shown in FIG. 8.

After entitlements are transferred, the system may flag any potential conflicts 804. For example, as shown in FIG. 8, if, after the update, an entitlement 806 is given to more than one user, the system may flag 804 the entitlement 806 in each of the user's profiles. A notification window 808 may be presented in the interface 800 that a potential conflict has arisen so that the user is aware of such. In this example, after the business 118a has transferred the entitlements 802, the system 100 may then send a notification (not shown) to Bank "A", which may be a third party 118b, that User3 has replaced User5 as the authorized officer to work with Bank "A". This notification may be to any party associated with the business or individual 118a.

In one embodiment, prior to changing over entitlements with another party 118b, the system 100 may send a confirmation message (not shown), such as a SMS, MMS, email message, web message, etc., to the other third party 118b in order for the other party 118b to approve the change in entitlements. In response to the confirmation message, the other party 118b may simply approve or disapprove of the change of entitlements. If the other party 118b approves of the change, a confirmation message will be sent to the business 118a and the entitlement change is completed; however, if the other party 118b disapproves, a rejection message is sent to the business 118a and the entitlements will not be transferred, but instead may optionally be deactivated. Regardless, such confirmation process would be done completely electronically and may be set up to be automatically confirm, reject or require permission by the other party 118b-d in response to receiving a confirmation message.

Various entitlements may be associated with the updated user profile. For example, within the relationship with Bank "A", User3 may be given authority to execute various transactions for various accounts held with Bank "A". For example, as shown in FIG. 8, User3 may be given authority to execute various transactions 809, such as ACH, Wires, Lockbox and/or RDS transactions associated with various accounts associated with a client 810, such as East Coast Depository account and/or the Man ACH-East account of Bank "A".

In the above illustrations, the business or individual 118a was able to electronically alter entitlement data and make the updated information available to other parties 118b-d with whom the business or individual 118a transacts without having to make any contact or only minimum contact with the other parties 118b-d. As is understood, various other information, documents, entitlements, etc. can be altered in a similar manner, such as, by example, upload and replacement of older financial documents and information with new information.

Scenario 2

In addition to allowing for upload, viewing, and update of documents and information, embodiments of the systems, methods, and computer program products also facilitate electronic transactions. For example, in some embodiments, the systems, methods, and computer program products may make data available to third parties for performing various business analyses on the business or individual 118a, creation of business documents, etc. For example, embodiments of the systems, methods, and computer program products may provide various electronic forms to the individual or company 118a to be filled out for use in transactions. The information input by the individual or business 118a into the forms is captured as field data. In some embodiments, the systems, methods, and computer program products may employ image recognition techniques to capture field data from documents scanned and uploaded by the business or individual 118a to the system 100. This data once recognized and processed may also be made available.

This captured data may be used to perform analysis on the business or individual 118 by third parties 118b-d, such as determine credit information, perform risk assessments, etc. The data may be used to fill out portions of various documents or forms to be used in conducting a transaction between the individual or business 118a and the other third parties 118b-d. For example, the data could be used to generate various forms needed to complete a loan transaction, create a new letter of credit, etc.

Figure 9:
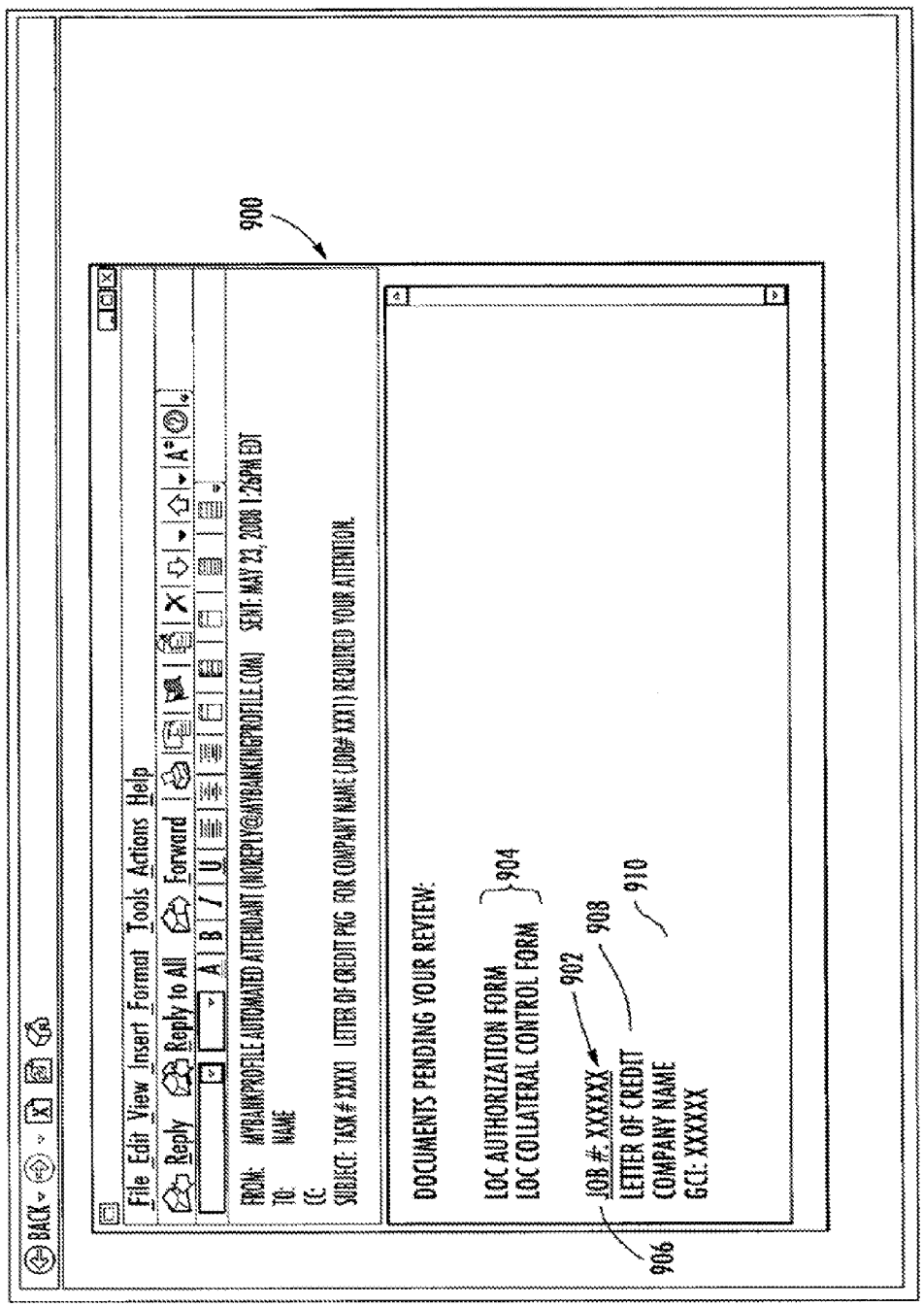
Figure 10:
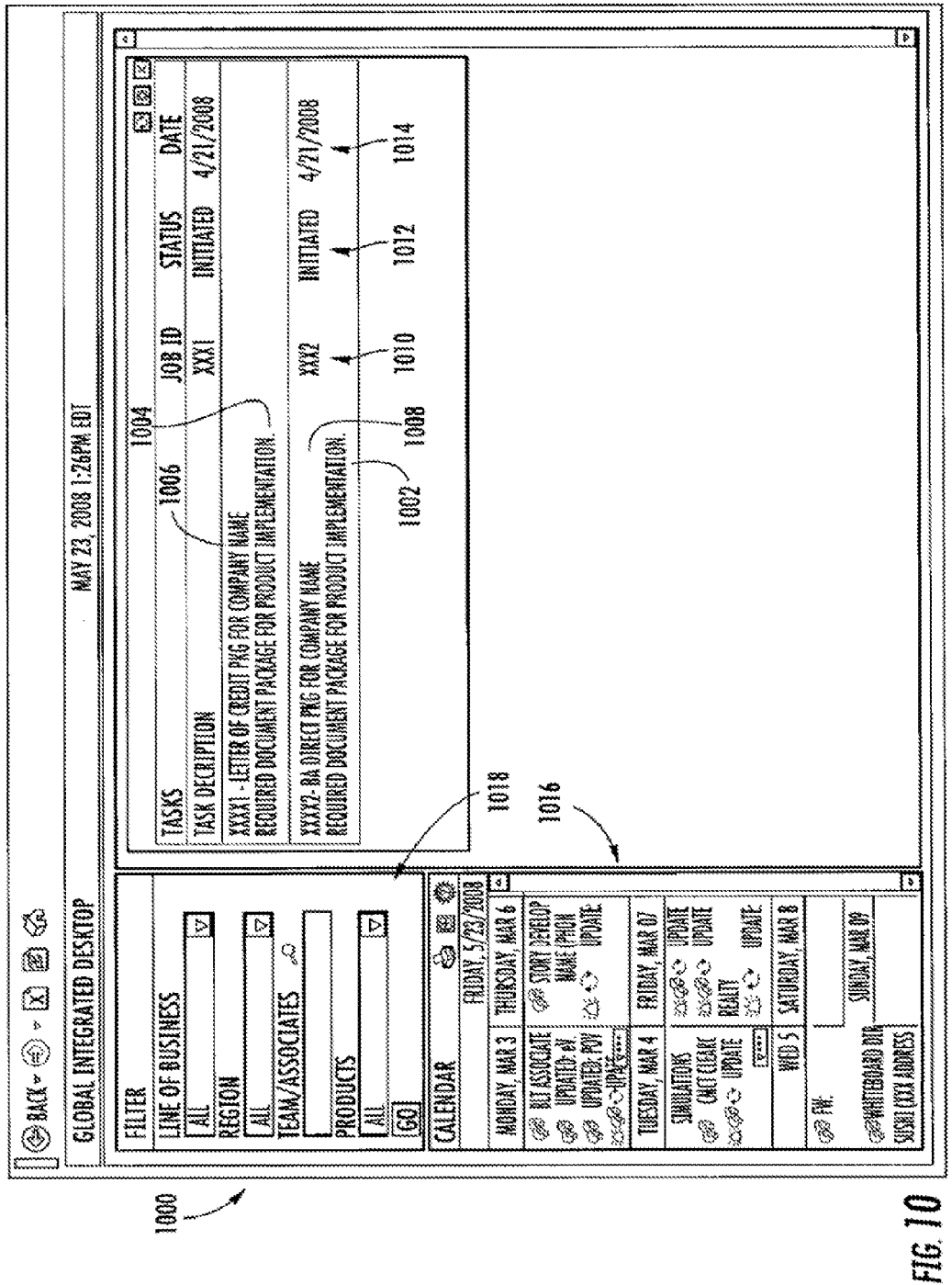
Figure 11:
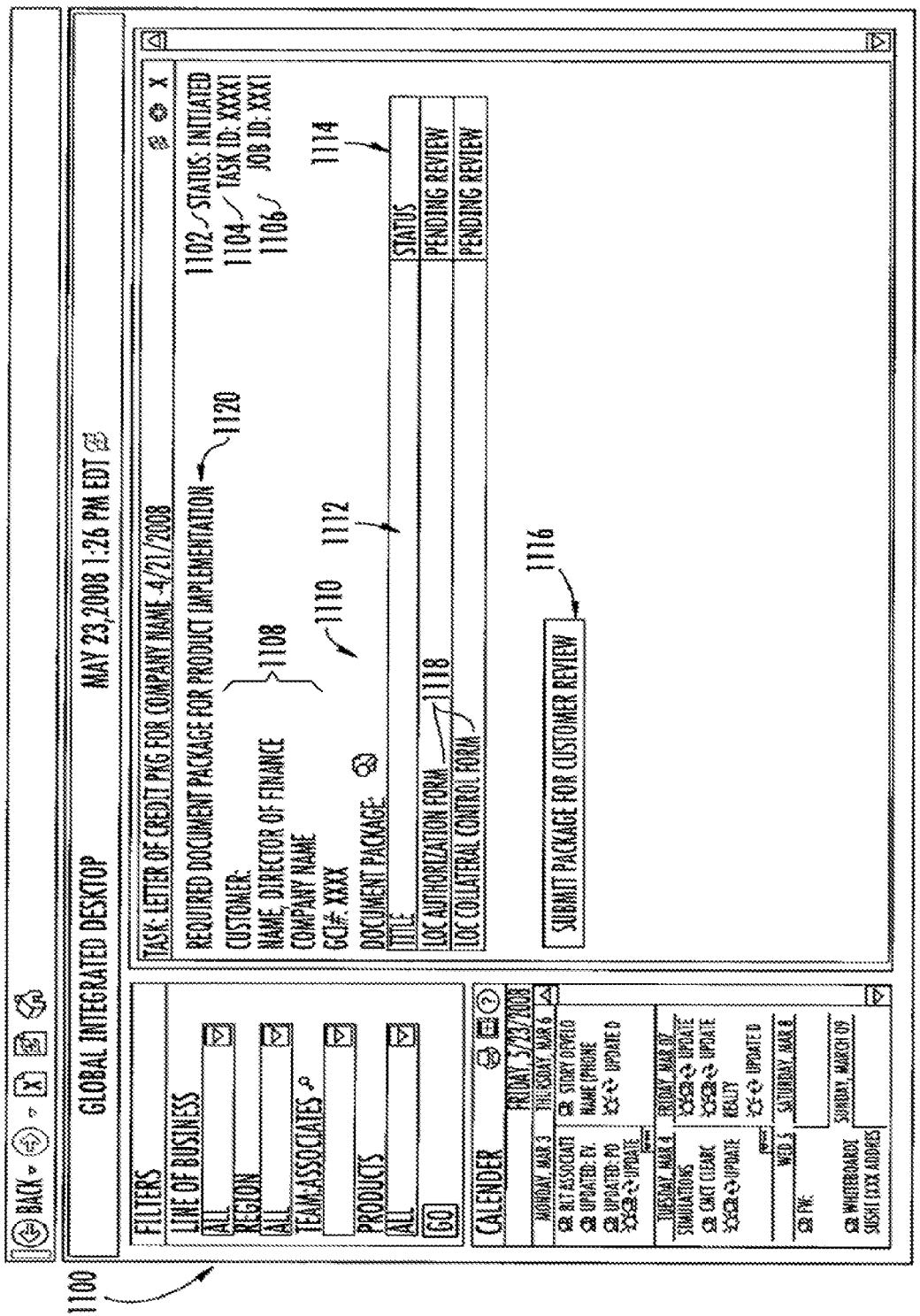

FIGS. 9-30 illustrate a series of steps and interfaces for facilitation of a transaction (e.g. creation of a new letter of credit) for a business or individual 118a. As illustrated in FIG. 9, a contact person at a third-party institution 118b may receive a notification 900, such as via an email, text message, etc., that a new letter of credit is needed or requested from the business or individual 118a. The notification 900 may include various information, such as information related to the documents pending review 904, job number 906, transaction information 908, company information 910, and any other information. The contact person may click on a link 902 provided in the email, which directs the contact person to a global integrated desktop interface 1000, as illustrated in FIG. 10. The global integrated desktop interface 1000 may be any interface that is integrated with the system to access and interact with the clients 18a-d and the storage system 116. The global integrated desktop interface 1000 may be compatible and/or integrated with all of the software of the system 100. From the global integrated desktop interface 1000, the contact person may view task descriptions 1002, 1004 of various transactions, such as a letter of credit task description 1002, that have been initiated, as shown in FIG. 10. The global integrated desktop interface 1000 may also provide other information about the tasks such as job ID 1010, task status 1012, task initiation date 1014, or any other like information relevant to the task. In one embodiment, the global integrated desktop interface 1000 may include other information helpful to the user of the interface 1000, such as a calendar 1016 including upcoming events, tasks, dates, etc. and also a filter 1018 capable of searching the system 100 using various parameters (e.g. line of business, region, team/associate entry block, products, etc.). Each task description 1002, 1004 includes a hyperlink 1006, 1008 which the contact person may click to access more information related to each respective task 1002, 1004. In one embodiment, the hyperlink 1006, 1008 routes the contact person to the interface 1100 illustrated in FIG. 11. The interface 1100 in FIG. 11 provides various information for the user, such as the task status 1102, task ID 1104, job ID 1106, information related to the client company or customer 1108, document package 1110, and other like information. The document package information 1110 may include information about the documents related to the task ID 1104, such as the title of the task 1112 and the status 1114 of the task. As shown in FIG. 11, the document package 1110 indicates that two documents are associated with task ID '334455' and both documents are pending bank review. The document title information 1118 may include a hyperlink associated with each document so that the user can access these documents. To review, complete, and/or edit the documents, the contact person clicks on the hyperlinks 1118 associated with each document. Optionally, a message 1120 may be included in the interface 1100 that indicates instructions to the customer or some other message for the customer.

Figure 12:
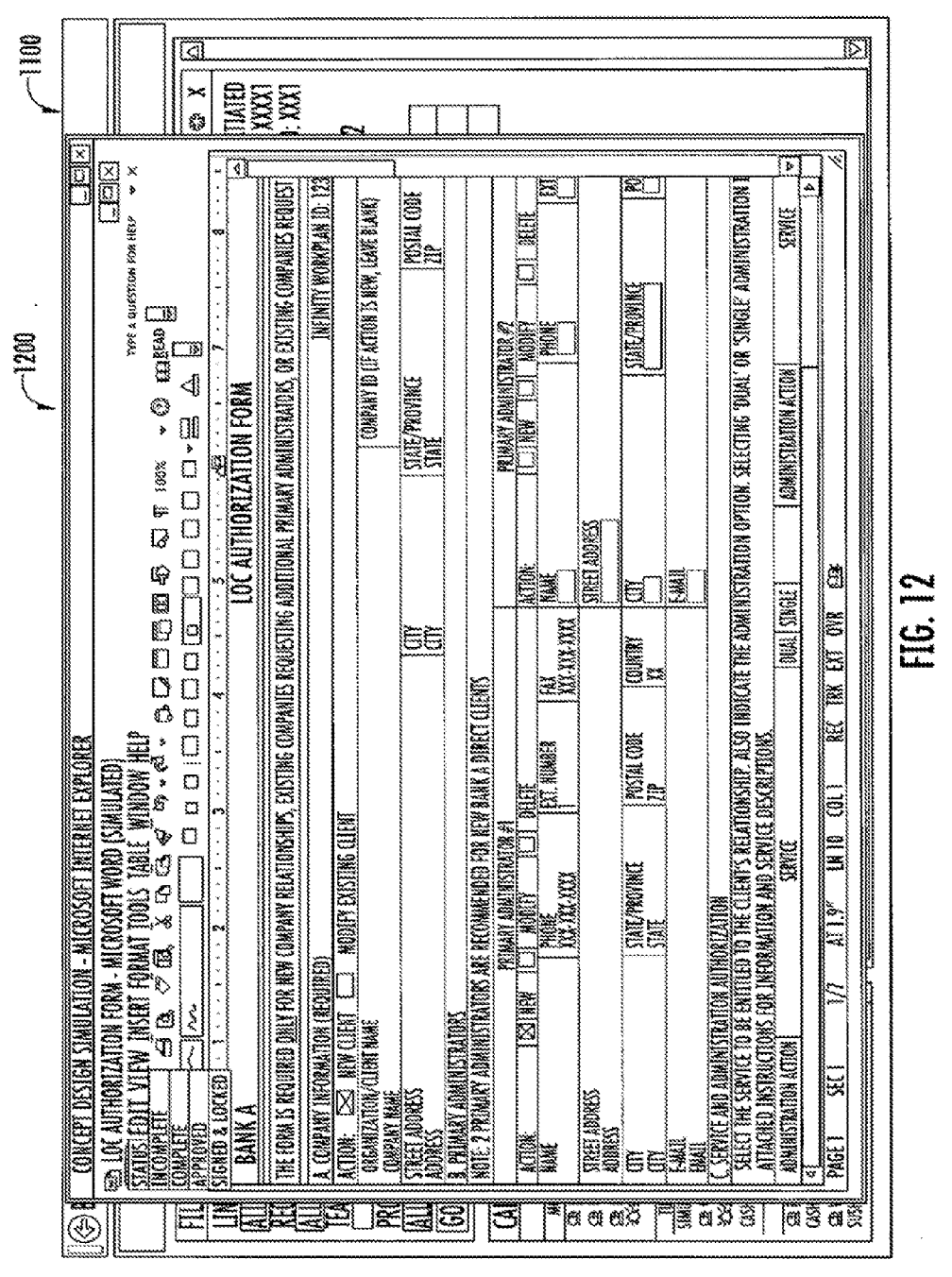

As illustrated in FIG. 12, the system 100 provides to the contact person an electronically editable version of each document 1200. The contact person may then review, complete, and/or edit each document 1200. The global integrated desktop 1100 is integrated with the system 100, and, thus, the contact person may review, edit, and/or complete the documents using the data stored in the storage system 116 for the business or individual 118a. In some embodiments, the stored data may be used to automatically populate the forms. For example, as illustrated in FIG. 12, the letter of credit form may have been pre-populated automatically with the data in the storage system 116.

Figure 13:
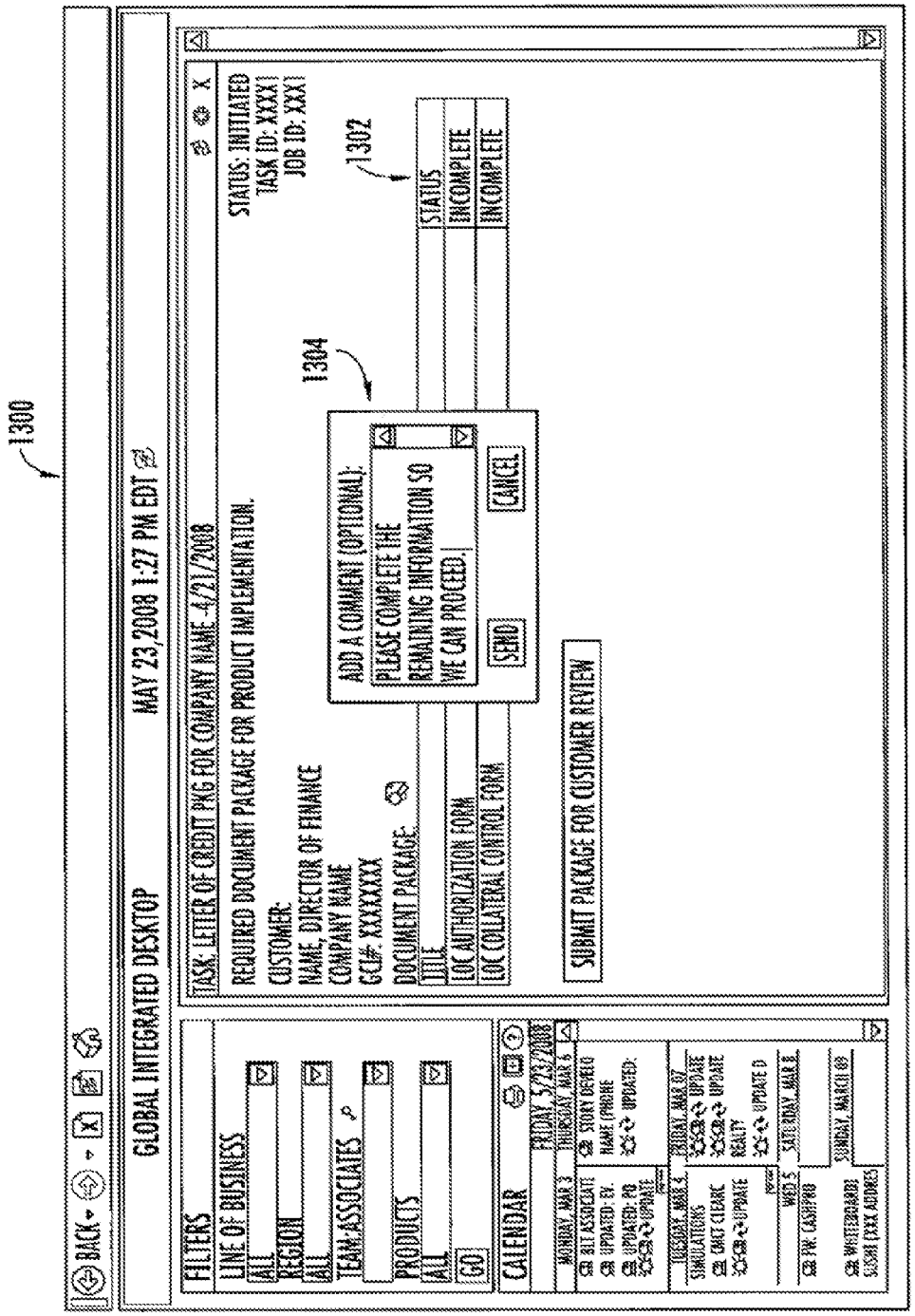

After reviewing, completing, and/or editing the documents, the contact person may then mark the document 1200 as incomplete, approved, complete, etc. and may be directed back to the global integrated desktop interface 1300 shown in FIG. 13 (similar to interface 1100 of FIG. 11), where the status 1302 is updated. As shown, the status 1302 of the documents are indicated as incomplete because, for example, information from the customer is required to complete the forms. The contact person may then route the letter of credit and document package via the system 100 to the individual or business 118a along with instructions 1304 to complete the remaining information. For example, as illustrated in FIG. 13, the contact person at the third party 118b may provide instructions to the contact person at the business 118a via a note 1304 that is routed along with the letter of credit and document package.

Figure 14:
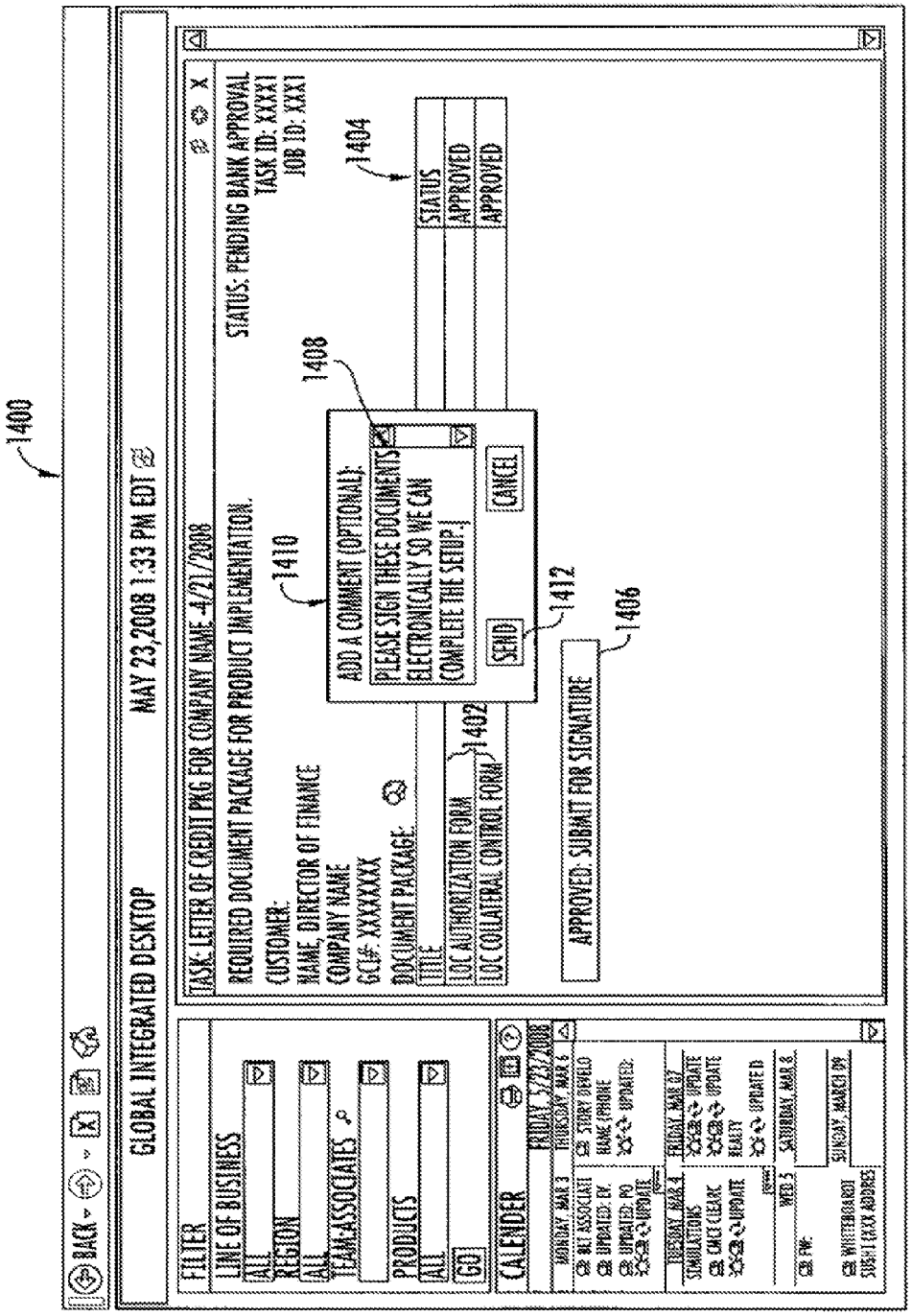

In one embodiment, after reviewing, completing, and/or editing the documents, the contact person of the third party 118b may be directed to the interface 1400 where the contact person may then mark the document 1402 from complete to approved, as shown in FIG. 14. In FIG. 14, the status 1404 of the all documents 1402 which were updated and signed now indicate 'Approved' and the 'Submit' button 1406 is activated so that the contact person may click the 'Submit' button 1406 to transmit the documents 1402 to the individual or business 118a for an electronic signature. The contact person may then transmit the letter of credit and document package via the system 100 to the individual or business 118a along with instructions 1408 to sign the documents electronically. In one embodiment, when clicking the 'Submit' button 1406, a confirmation window 1410 may be displayed where the contact person must click 'Send' 1412 to confirm that the contact person wants to transmit the document package. This confirmation window 1410 may also include an area 1408 where the contact person can optionally add a comment and/or instructions. As such, the contact person may set up and have the form pre-populated for the client so that the document package can simply be sent to the customer for the customer's approval. This provides a transparent operation to the user prior to the user signing off on the form.

Figure 15:
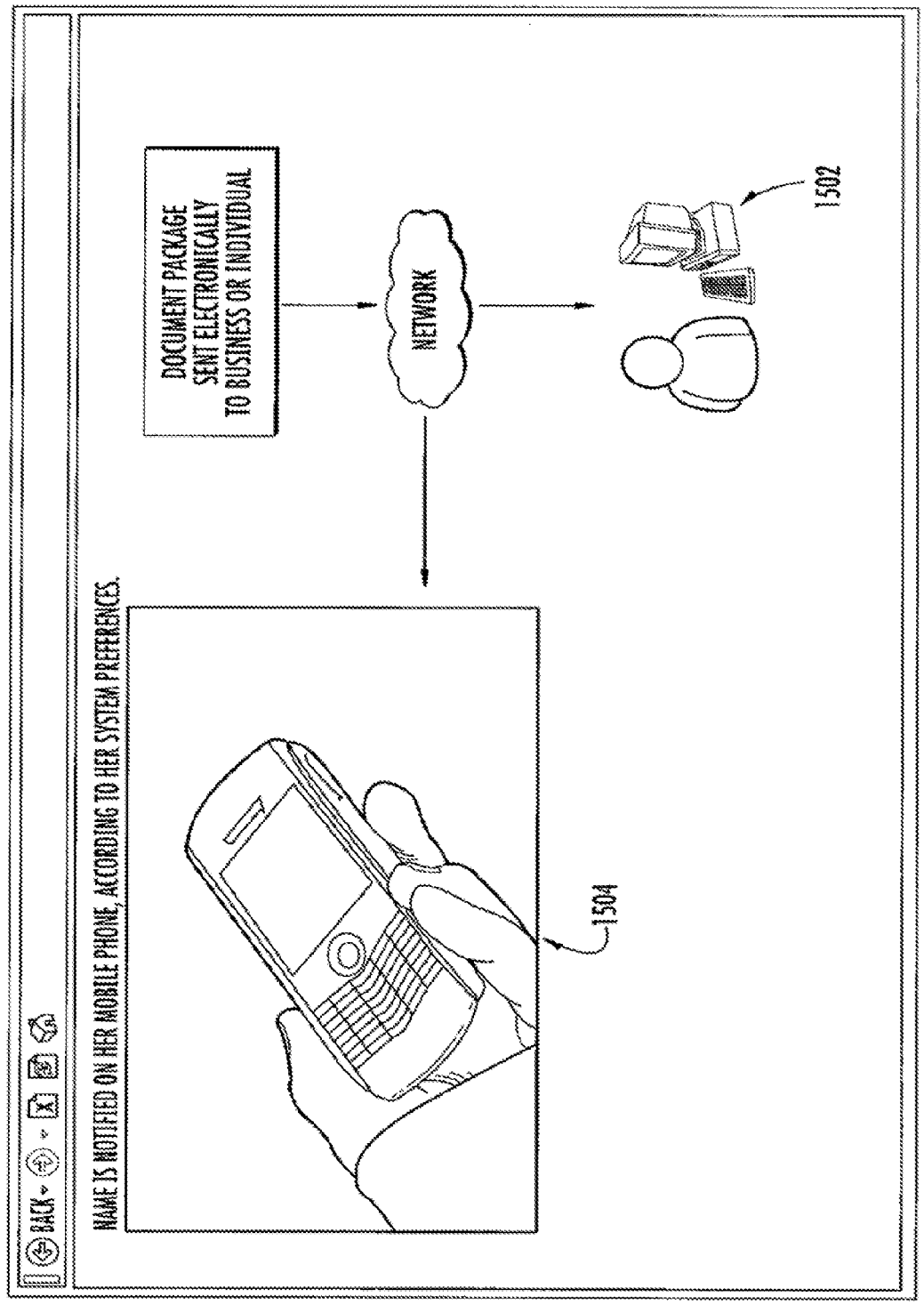
FIG. 15 is a block schematic of an example of a system of a business transaction facilitation system in accordance with another embodiment of the present invention.

In FIG. 15, the contact person at the individual or business 118a is notified of the receipt of the letter of credit and document package. The customer may be alerted or notified by any means, such as by email, text message, instant message, html message, or any other way to electronically notify or alert a user and such notification or alert may be transmitted to any electronic device, including a computer 1502, personal electronic device 1504 (e.g. PDA, cell phone, mobile computer, etc.), mobile electronic device, server, or any other electronic device capable of receiving electronic messages, notifications and/or alerts. FIG. 15 shows that the contact person at a business 118a receiving a notification via a PDA 1504. The notification may be a message (not shown) having a summary of the documents or action items pending approval, any messages attached to the alert or notification, the party transmitting the notification and a link for the contact person to automatically access the pending document.

Figure 16:
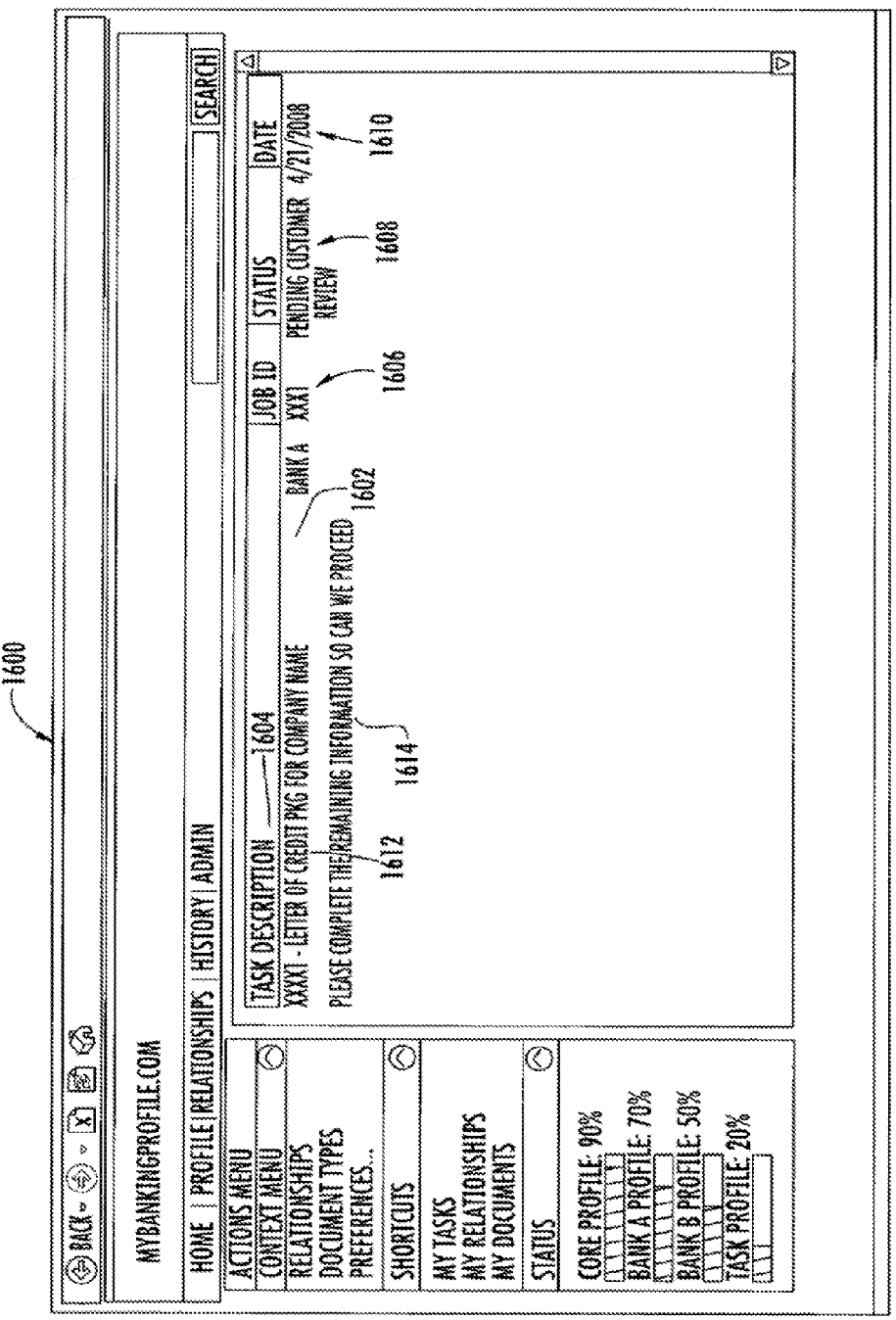

In FIG. 16, the individual or contact person at the business 118a accesses the portal or interface 1600, by for example, logging onto the system 100 and notes the pending letter of credit and document package that is ready for the authorized individual's signature. The pending document 1602 is shown by providing a task description 1604, job ID 1606, status 1608, initiation date 1610 and the like. The pending package has a link 1612 by which the individual can access the pending items associated with the business 118a. Optionally, a message may accompany the interface 1600 providing instructions or any other information to the individual or contact person at the business 118a. In FIG. 16, the message instructs the customer to complete the remaining information in the letter of credit so as to complete the form.

Figure 17:
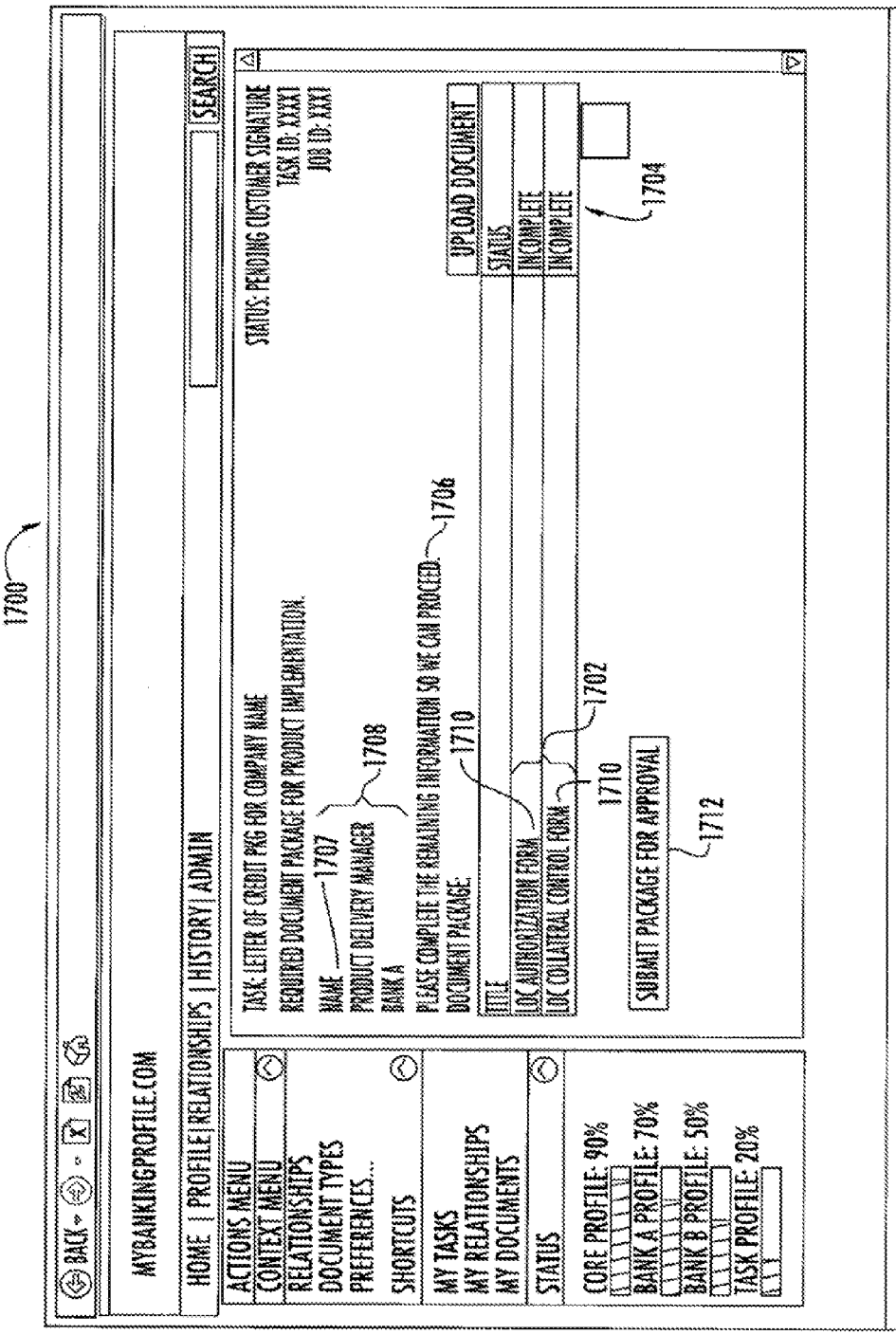

After clicking the link 1612 in interface 1600, the user may be presented with another interface 1700 as shown in FIG. 17. In FIG. 17, the pending documents 1702 may be displayed along with a status indicator 1704 associated with each item 1702. A brief instructional message 1706 from the sender 1707 along with the sender's information 1708 may be included in the interface 1700. The contact person at the individual or company 118a reviews the instructions for completion 1706 and accesses the documents 1702 by clicking the appropriate hyperlink 1710 associated with each required item 1702. Note that in FIG. 17, the 'submit' button 1712 is temporarily deactivated due to the fact that the letter of credit status 1704 is incomplete. When the letter of credit forms are completed, the submit button may reactivate and the status may be changed, as described later with respect to FIG. 19.

Figure 18:
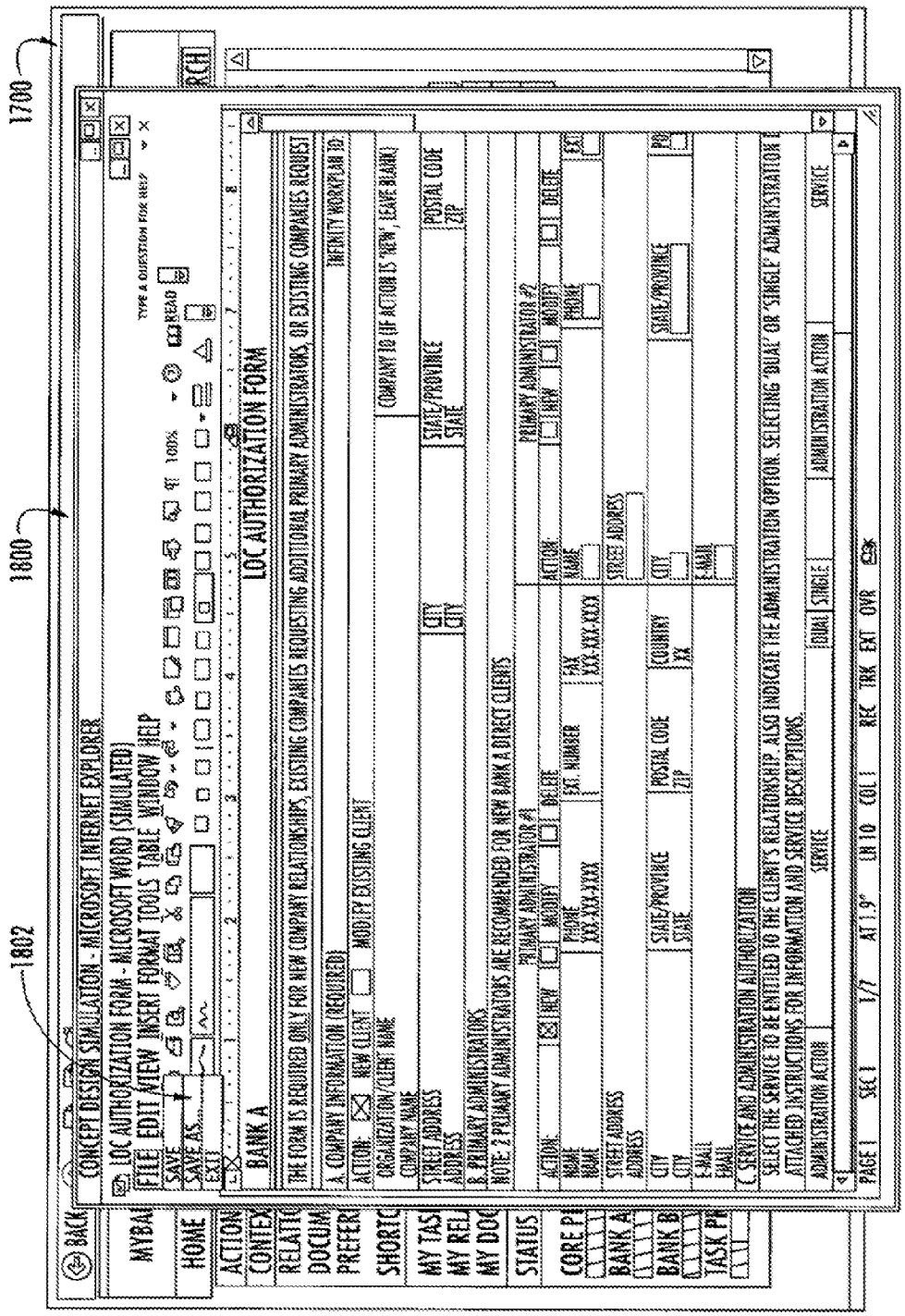

After clicking each link 1710, the system 100 may check to see if the user is an authorized individual to view the document 1800 or transaction details. Upon determining the user is authorized, the user is allowed to view and complete the required items in each document 1800, as shown in FIG. 18. In one embodiment, the business 118a may complete the documents 1800 using previously entered information and data stored in the storage system 116. In some other embodiments, the stored information and data may be used to automatically complete the forms. After entering in information to the form and/or completing the form, the user may save the form, which may then return the user to interface 1900. The user may then electronically sign the documents.

In various embodiments, the user may then transmit the completed documents to the third party 118b without signing the documents. The contact person at the third-party 118b may receive the completed documents and, via the global integrated desktop, reviews the documents. The contact person may perform operations discussed above with FIG. 14 in approving the form and sent the approved form to the customer for signature. However, it should be understood that the contact person may not approve the form, and instead send the forms along with an instructional message or other information to the user to edit and/or complete the forms.

Figure 20:
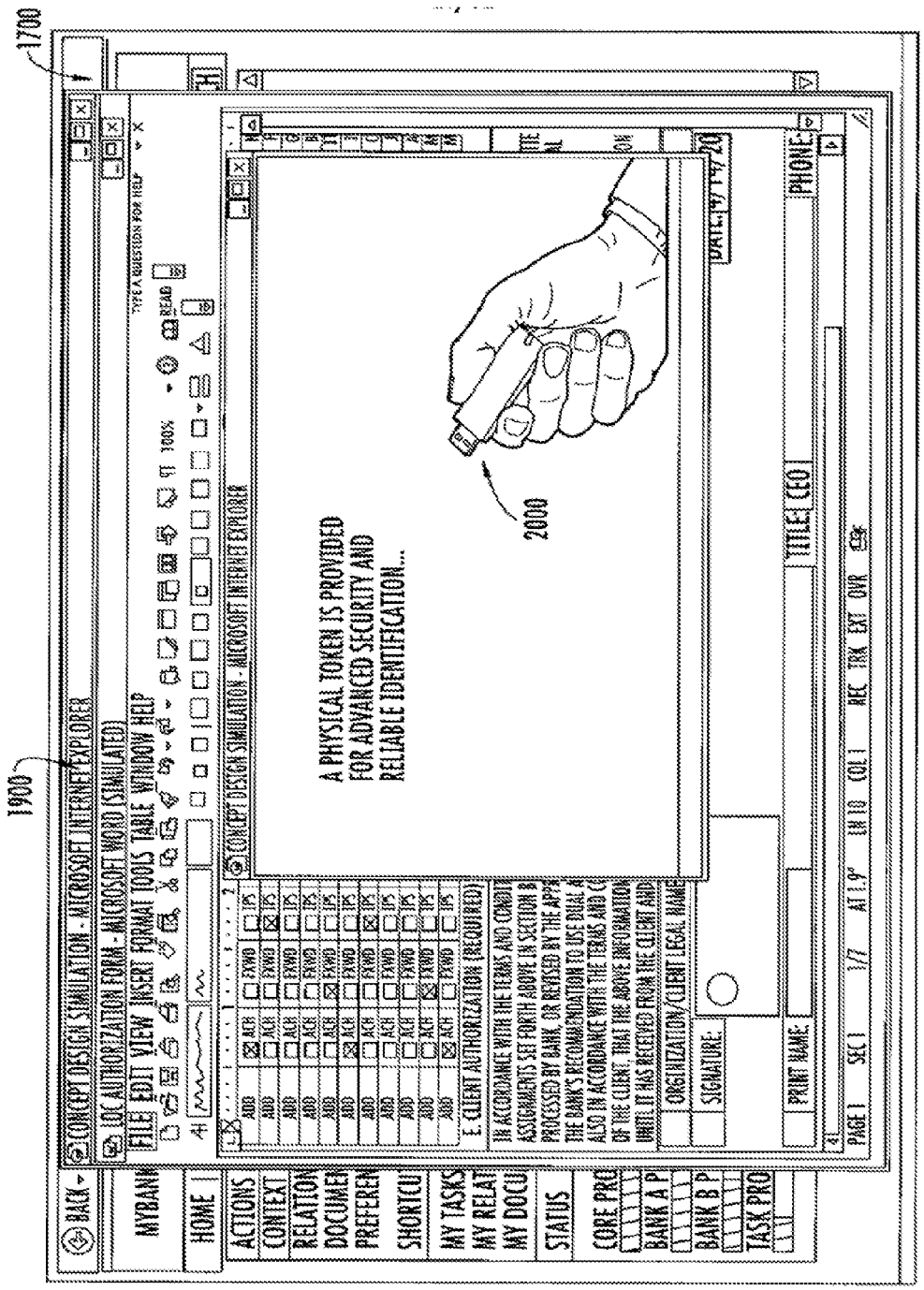

In FIGS. 19-22, after satisfactorily reviewing and updating each document 1900, the user at the individual or business 118a sees one or more signatures are required via a signature block 1902. Signatures may be provided by any method, such as electronically signing the document 1900. For example, after reviewing the document 1900, the user may indicate the user wants to electronically sign the document 1900 by clicking on the signature block 1902. In one embodiment, after indicating the user would like to electronically sign the document 1900, an electronic signature window 1904 is presented to the user for the user to select her digital ID that will be her electronic signature. The electronic signature window 1904 presents the digital IDs 1906 associated with the user. Each digital ID may include digital ID information, such user name 1908, issuer of the electronic signature 1910, the storage mechanism of the electronic signature 1912 and when the digital ID expires 1914. Other options are also included in the electronic signature window 1904, such as a digital ID selection persistence option 1916, an option to add a digital ID 1918, and other options (e.g. refresh the digital ID window 2020) as shown in FIG. 20. Although FIG. 20 illustrates that only one digital ID 2022 is associated with User3, several selectable digital IDs may be associated with each user and each selectable digital ID may be customized for different purposes. Regardless, after the user selects the digital ID 2022 that she will be signing with, the system 100 may then authenticate by checking that user has authorization to electronically sign the document as evidenced by the contact person's entitlement profile.

Figure 21:
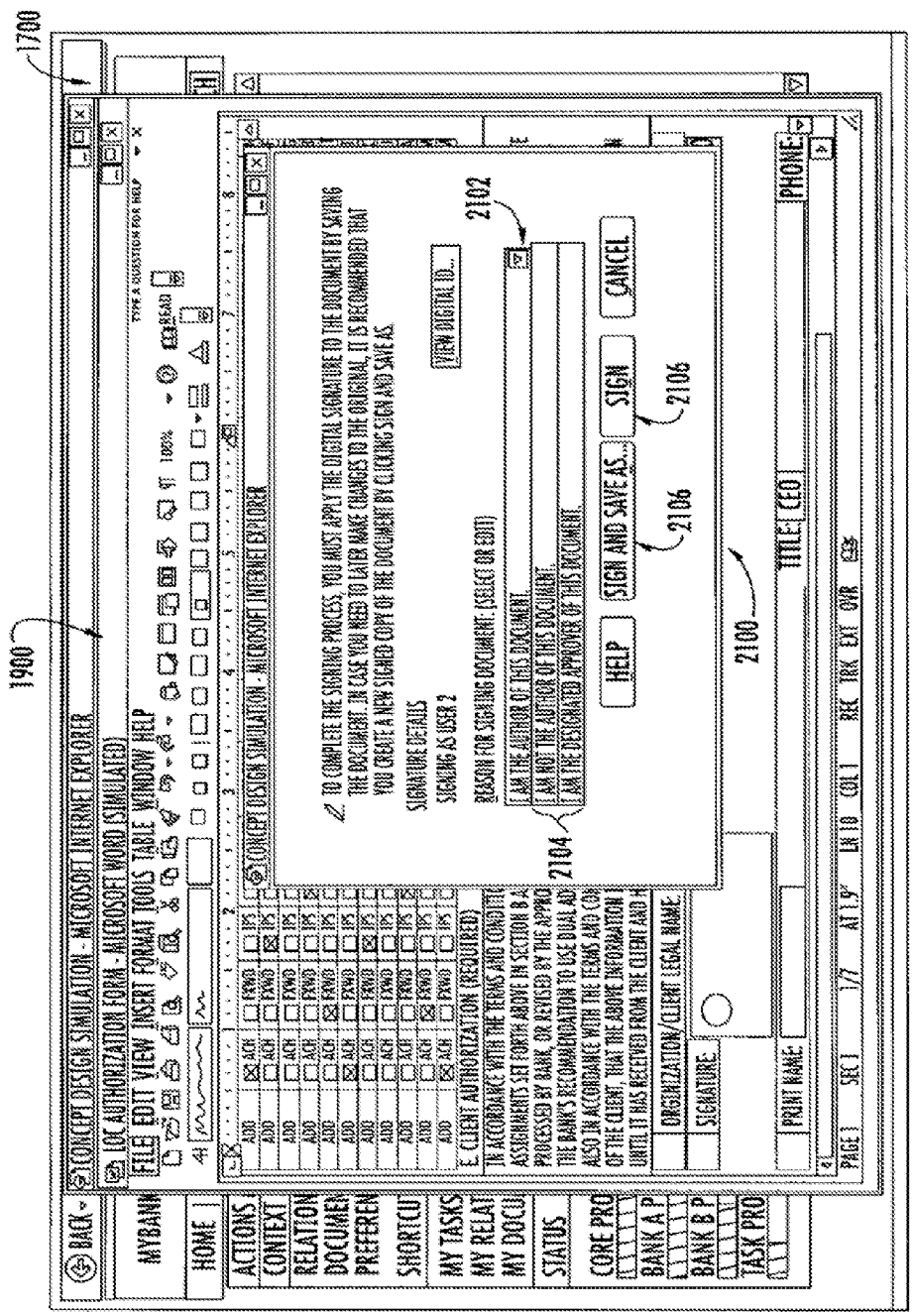

In one embodiment, various security features may be added to ensure reliable signatures are added to each document 1900. For example, as shown in FIG. 21, a physical token or hardware key 2000 may be provided to the user and employed in concert with the electronic signature for advanced security, reliable identification purposes and the like. The token 2000 may be plugged into the computer as a hardware key or the token 2000 may generate a password or key that must be entered into the system for the electronic signature to be verified. Regardless, if a token 2000 is required to electronically sign a document, the token must enable the system 100 (e.g. by plugging in the token 2000 to the computer, providing a password from the token 2000, etc.) to allow electronic signatures in order for the user to apply his electronic signature to the document 1900. On the other hand, if the token 2000 is required, but has not enabled the system 100 to allow electronic signatures, the system 100 will not electronically sign the document 1900 and optionally, a notification may be sent to the user and/or administrator of the system 100 to indicate the token 2000 is required.

In another embodiment, as shown in FIG. 21, an interface 2100 is provided to the user so that the user may indicate whether the user is the author or approver of the document 1900. A drop-down menu 2102 allows the user to choose which option 2104 is appropriate. Further, the options 2104 are allowed to be edited in the event that the user decides to add or modify one of the presented options 2104. After an option 2104 is selected by the user, one or more buttons 2106 may be presented to the user for the user to sign the document 1900. After the user clicks one of the presented buttons 2106, the document 1900 is electronically signed by the system and the electronic signature becomes an integral part of the document 1900.

Figure 22:
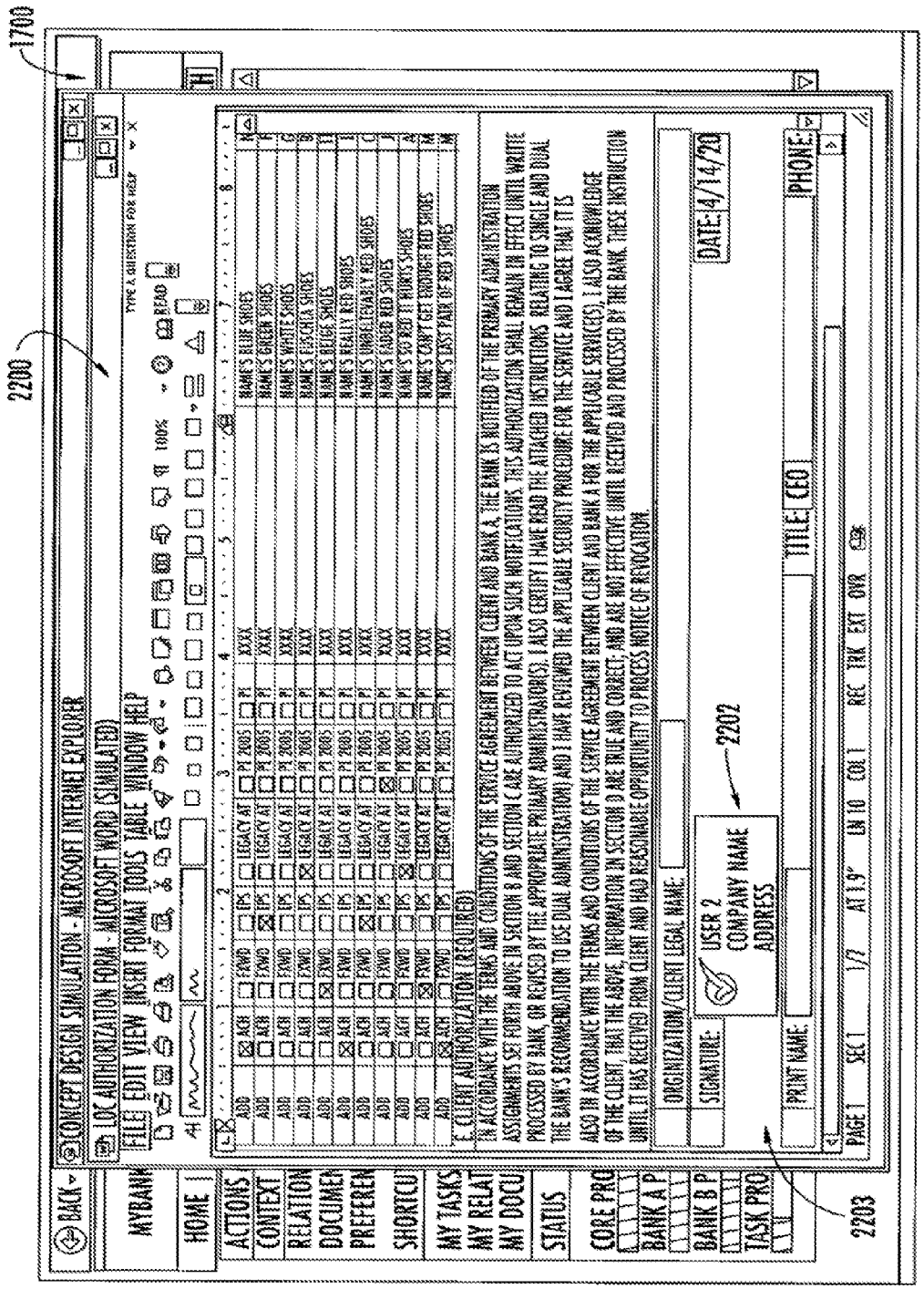

FIG. 22 shows the document 2200 indicates that the user has electronically signed in the document, such as by providing an illustration of an electronic signature 2202 on the signature block 2203 of the document 2200, as shown in FIG. 22. It should be noted that only one signature was required for the document in FIG. 22; however, any number of signatures may be required for any document.

Figure 23:
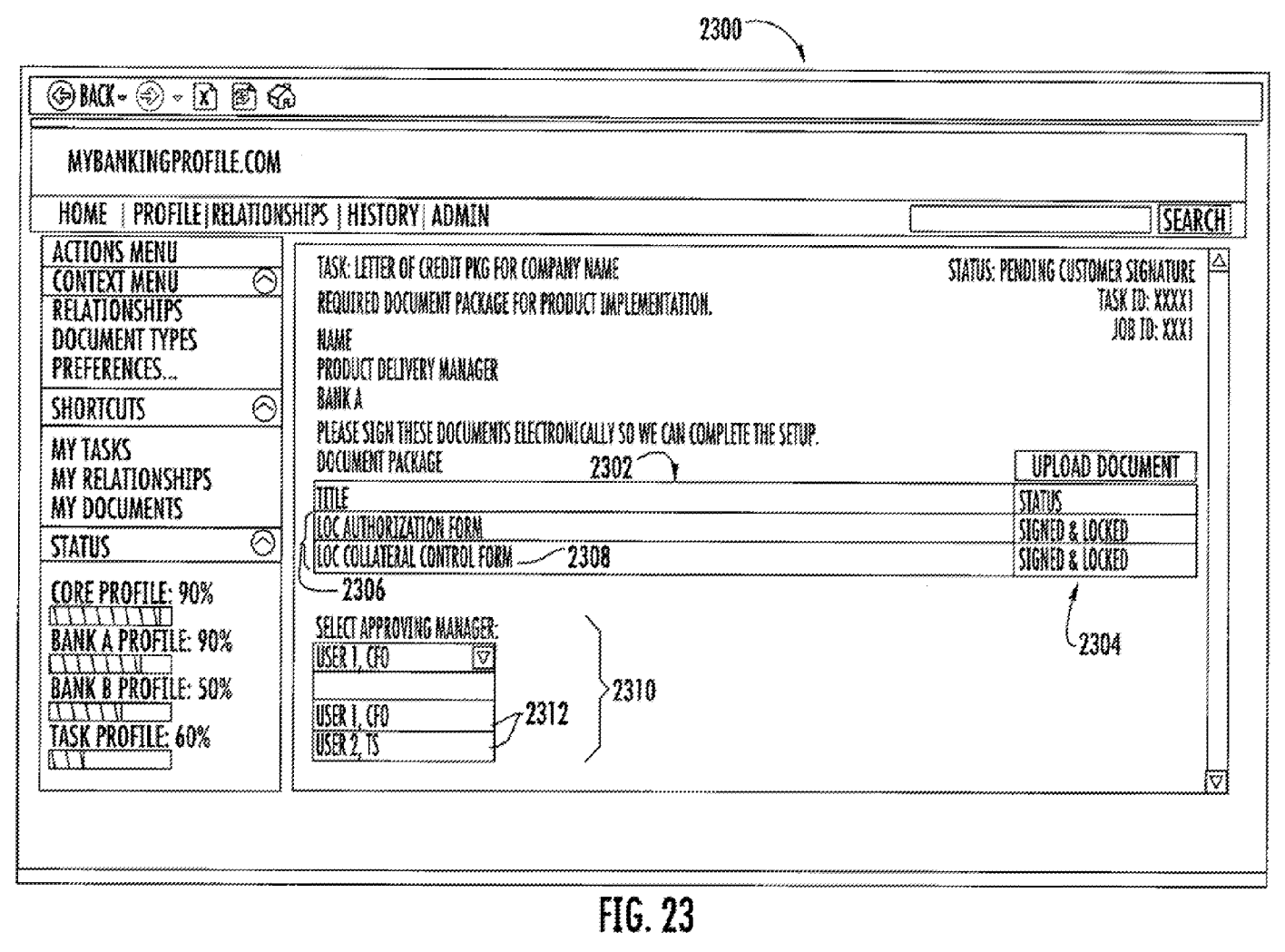
Figure 24:
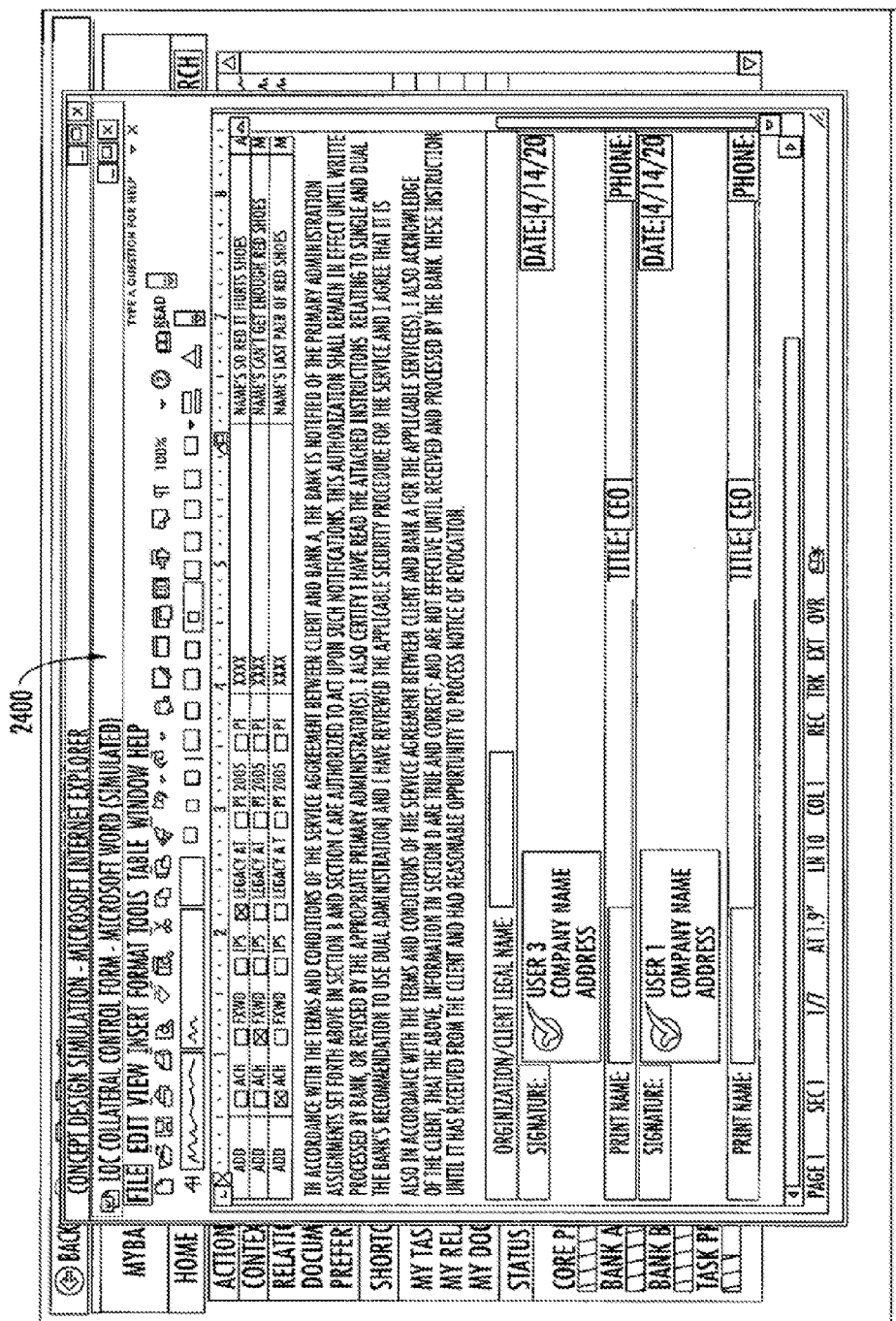

After electronically signing the document 2200, the user may save all changes made to the document 2200 by, for example, a drop down menu and the user is returned to the interface 2300 shown in FIG. 23 (which is similar to the interface 1700 shown in FIG. 17). The document 2200 is then updated in the storage system 116 and the status 2302 of the document 2200 is changed to 'Signed and Locked.' Then, as shown in FIG. 23, the user is directed back to an interface 2300 where the document package 2302 reflects the updated status 2304. Through this interface 2300, the user progresses through the same process as described above to complete, update and/or sign all other documents 2306 that are required for the document submission package 2302. For example, in the second document 2308 to be completed and signed (e.g. LOC Collateral Control Form), the user fills in the required information, as previously described. However, in this particular exemplary document 2308, two signatures are required by the individual or company 118a. A drop-down menu 2310 indicates another contact, such as an approving manager 2312, is required and allows the user to select the approving manager 2312 from a predetermined list of managers. In one embodiment, the approving manager 2312 may be preselected and indicated in the interface 2300, which will alert the user that at least one more signature is required. In some other embodiments, after the second document is electronically signed by the user, a notification may be routed to the second contact (e.g. the approving manager 2312) in a similar manner as described above with regard to sending notifications and alerts to a user. Upon receipt of the notification or alert, the second contact logs in to his account on the system 100 and applies his electronic signature in a similar fashion as described above with regard to electronic signatures. The electronic signatures of both contacts for the company 118a is shown in the document 2400, as illustrated in FIG. 24. Thereafter, the second contact saves the changes to the document 2400 and the user may be returned to interface 2300 in order to submit the document package.

After the documents have been filled in, reviewed and fully signed, the user or other authorized individual selects to submit the document package and the system 100 electronically transmits the documents to the third-party 118b for approval. It should be appreciated, that, instead of a contact person at the business 118a completing the forms, the system 100 may automatically complete the forms and submit the complete forms for the third-party 118b for approval such that little or no interaction is required. After receipt of the fully executed document package, the contact person for the third party may then continue the internal transaction process to completion, all without having to exchange one piece of paper between the business or individual 118a and the other entities 118b-d FIG. 25 is an interface 2500 illustrating an exemplary transaction history 2502 for a transaction. Such transaction history 2502 illustrates how quickly a transaction can be completed. The document package is initiated, automatically completed, and submitted to the business 118a at 1:50 pm (steps 2504 and 2506), and the business 118a reviews the completed documents and returns them to the third-party 118b for approval at 1:51 pm (step 2508). Within a minute, the third-party 118b approves the documents and resubmits the documents to the business 118a for signature (step 2510). The business 118a electronically signs the documents and delivers the signed documents at 1:53 pm (step 2512).

Figure 26:
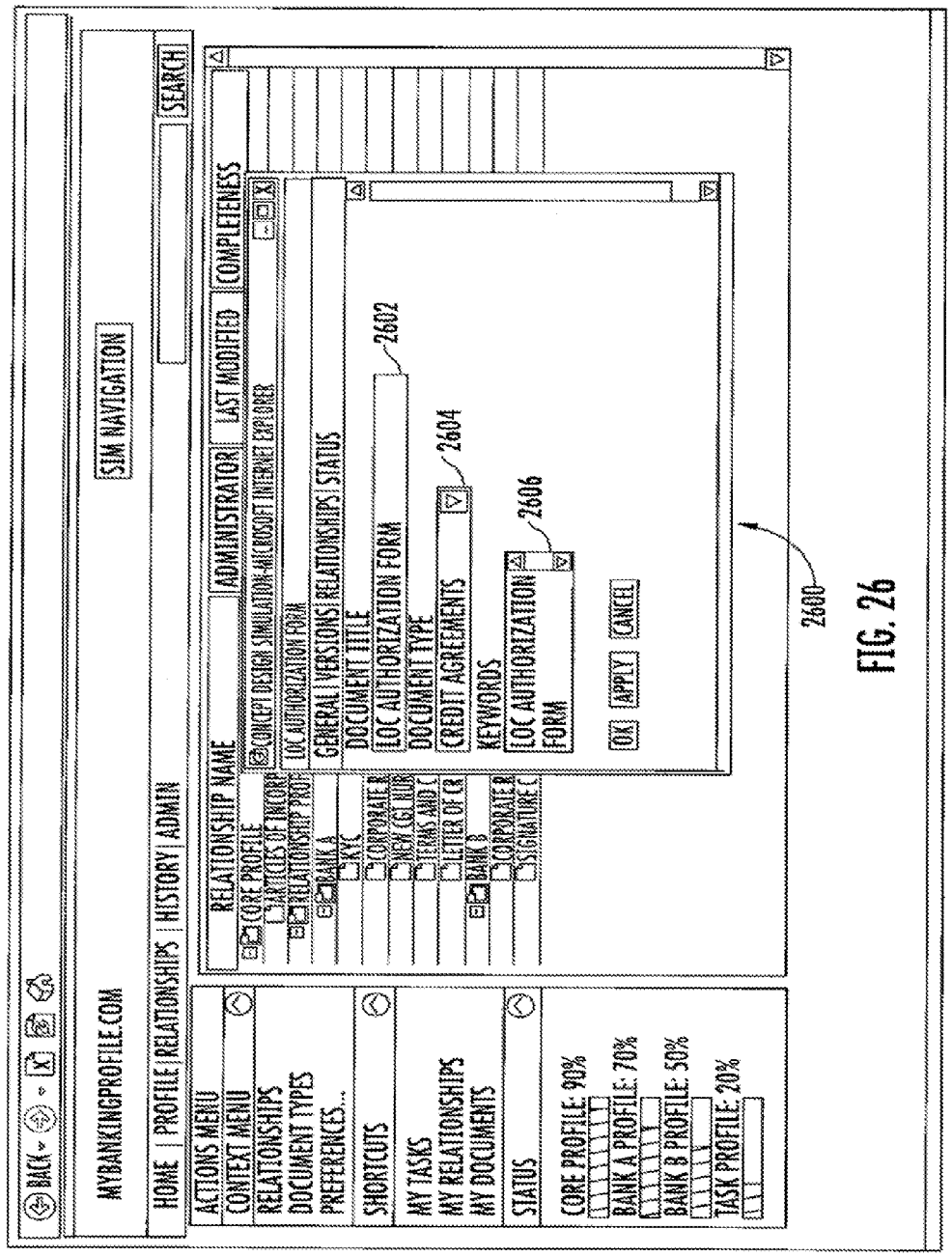

In FIGS. 26-29, following signature, the letter of credit or other documents may be added to the storage system 116. In FIG. 26 an interface 2600 is presented to the user to input various data fields, such as document title 2602, type 2604, keywords 2606, etc., that are associated with the document. The keywords 2606 allow for a user to easily search for the document via a search engine associated with the storage system 116. After the data fields 2602, 2604, 2606 are inputted, the user may click 'Apply' 2608 and/or 'Ok' 2610 to transmit these parameters to the storage system 116. The storage system 116 will add or update the information in the database.

Figure 27:
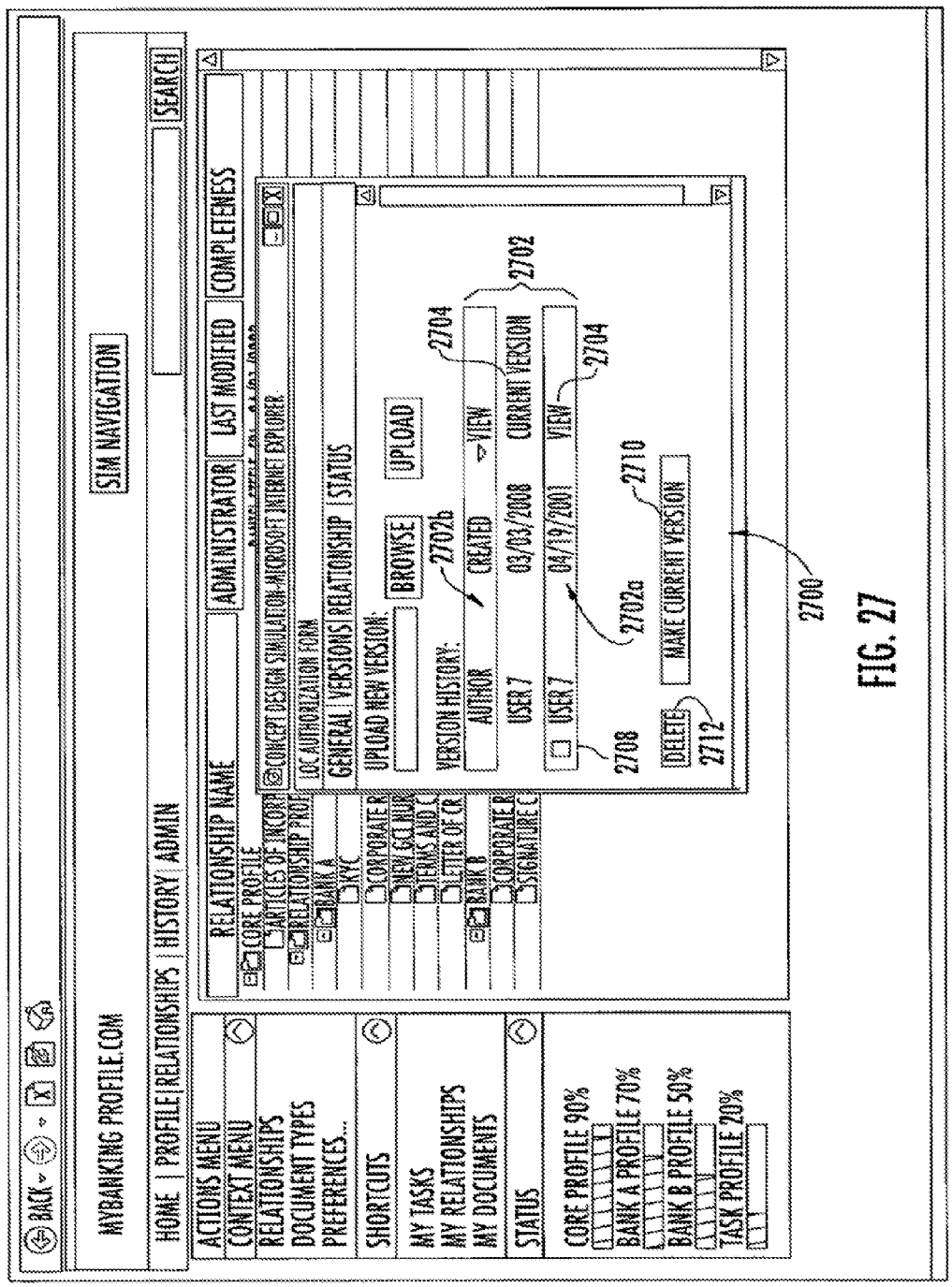

In FIG. 27, an interface 2700 may be presented to the user listing the versions 27802 of the document. Any of the listed versions 2702 may be viewed by clicking on the respective hyperlink 2704 associated with each version. The old version 2702a of the document may be selected (e.g. by clicking a check-box 2708) to be deleted or make the current version 2702b by clicking the respective buttons 2710, 2712 shown at the bottom of the window in FIG. 28, as desired by the business or individual 118a. After making any of such changes, the storage system 116 is accordingly updated. For example, if the old version 2702a is submitted to be deleted, the storage system 116 will delete the old version from the database. Also, if the old version 2702a is selected to be made the current version, the storage system 116 will update the parameters associated with the current version 2702b and the selected old version 2702a to make the selected old version 2702a the current version and to characterize the current version 2702b as an old version.

Figure 28:
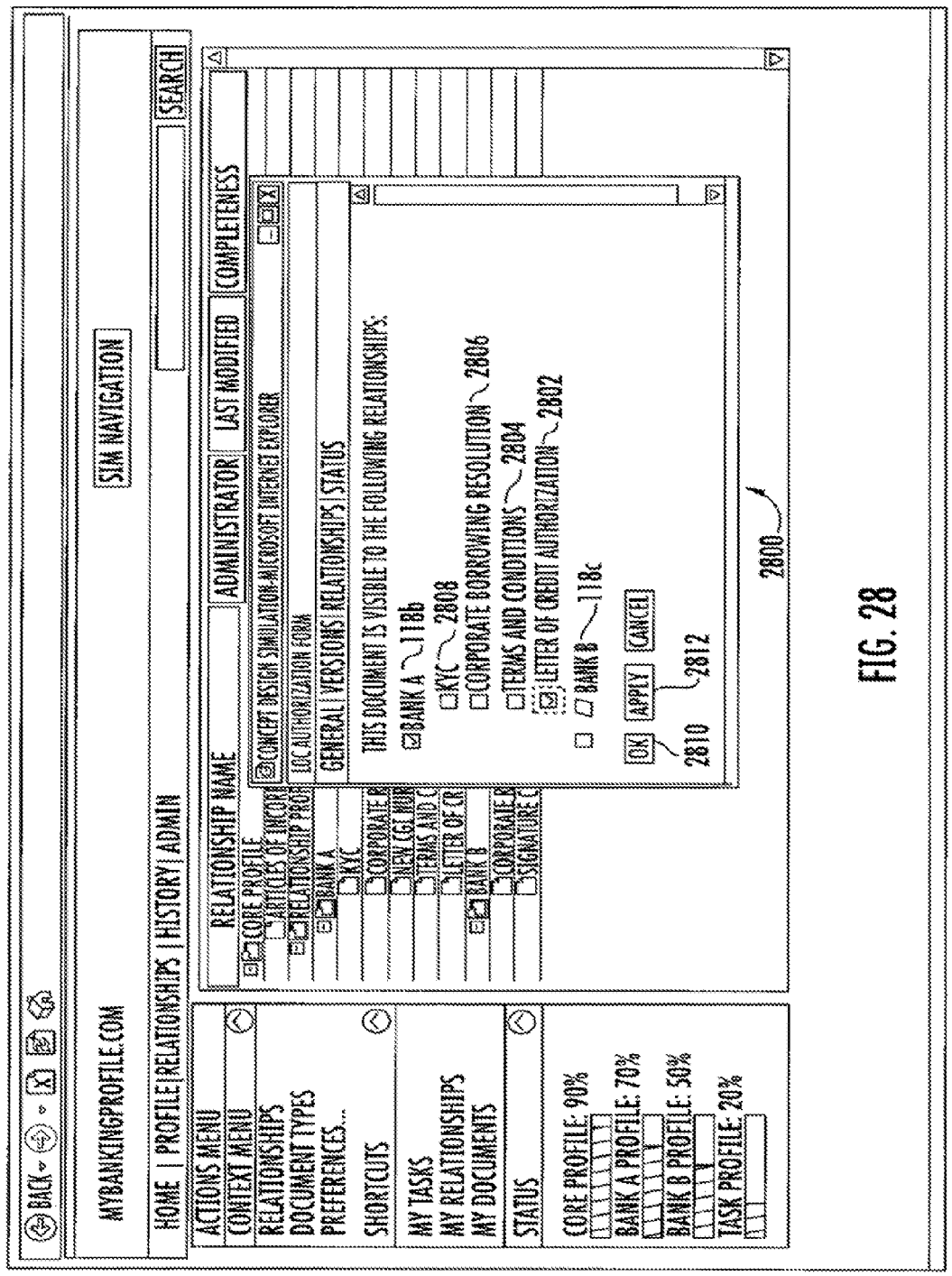

In FIG. 28, levels of security and access are set for the document via an interface 2800. For example, the business 118a can designate which third-parties 118b-d can access the document. FIG. 28 shows that Bank "A" 118b can only view the Letter of Credit Authorization document 2802. As illustrated the user may authorize Bank "A" 118b to view other documents 2804, 2806, 2808 shown or to allow Bank "B" 118c to view any of the uploaded documents 2802, 2804, 2806, 2808. After the user is done with the interface 2800, the user may click 'Apply' 2810 and/or 'Ok' 2812 to transmit these parameters to the storage system 116. The storage system 116 will add or update the information in the database.

Figure 29:
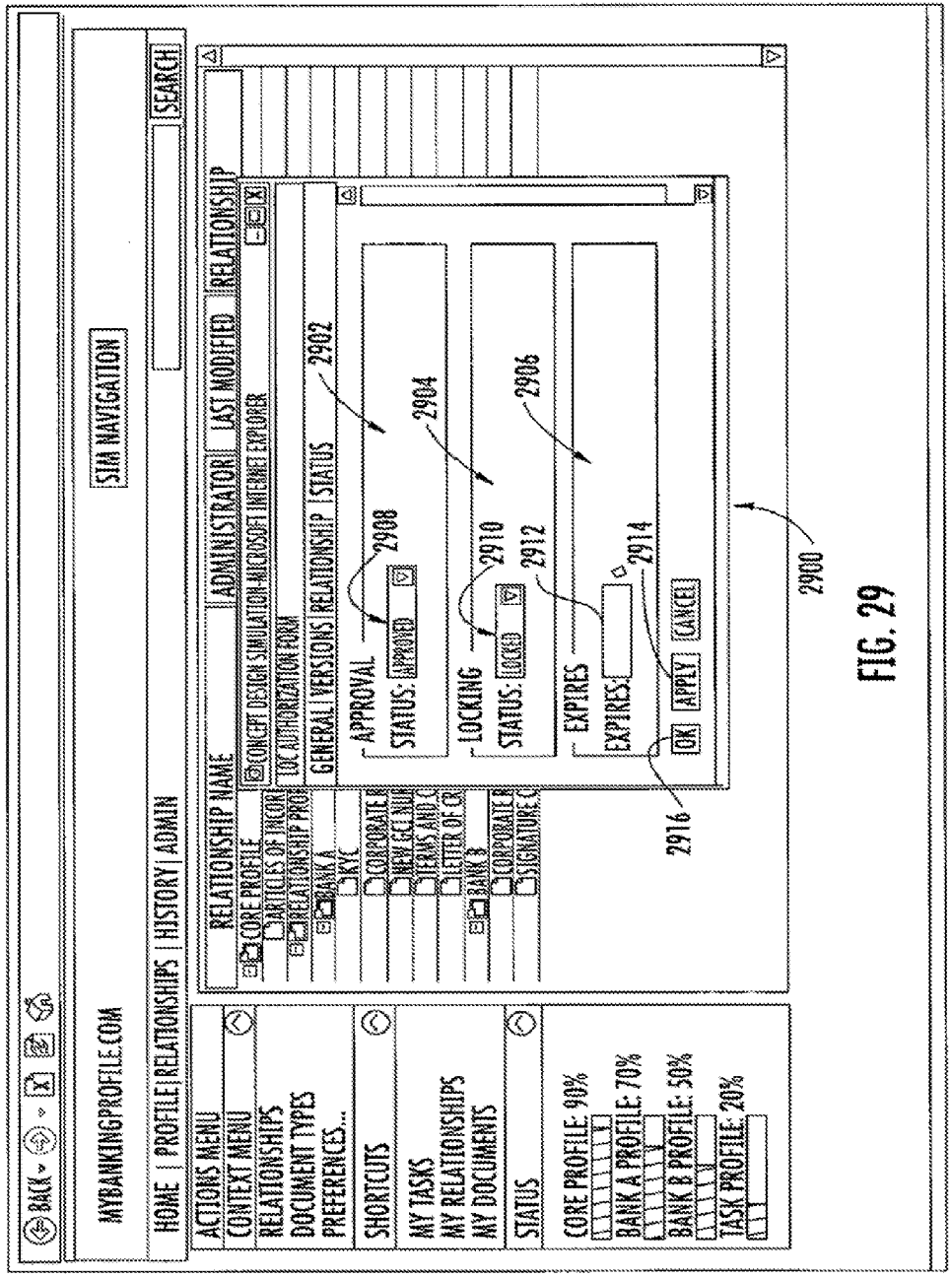

In FIG. 29, the document receives final approval and can be locked so as to prevent further editing. A window 2900 may be presented to the user to present various options to the user, including approval status 2902, locking status 2904, and an expiration 2906. The user may change the status 2902 of a document at any time, from approved to disapproved, even if the user has previously signed and transmitted a document. This may be done via a drop down menu 2908 in the approval option area 2902 of the window 2900. The user may also unlock or lock a document, as desired, via a drop down menu 2910 in the locking status option area 2904. For example, if a user has approved a document and locked the document, the user may want to change some information in the document. At this point, the user may unlock the document and disapprove the document, until the user can make the desired changes. In the expiration option area 2906, the user may define a period of time that the document (via, e.g. a entry box 2912) must be accepted by the other party 118b-d before the document expires, the user's signature expires, etc. All changes in the documents will be transmitted to the appropriate third party. After the user is done with the window 2900, the user may click 'Apply' 2914 and/or 'Ok' 2916 to transmit these parameters to the system 100 and/or the other entity 118b-d. The storage system 116 will add or update the information in the database.

Scenario 3

Figure 30:
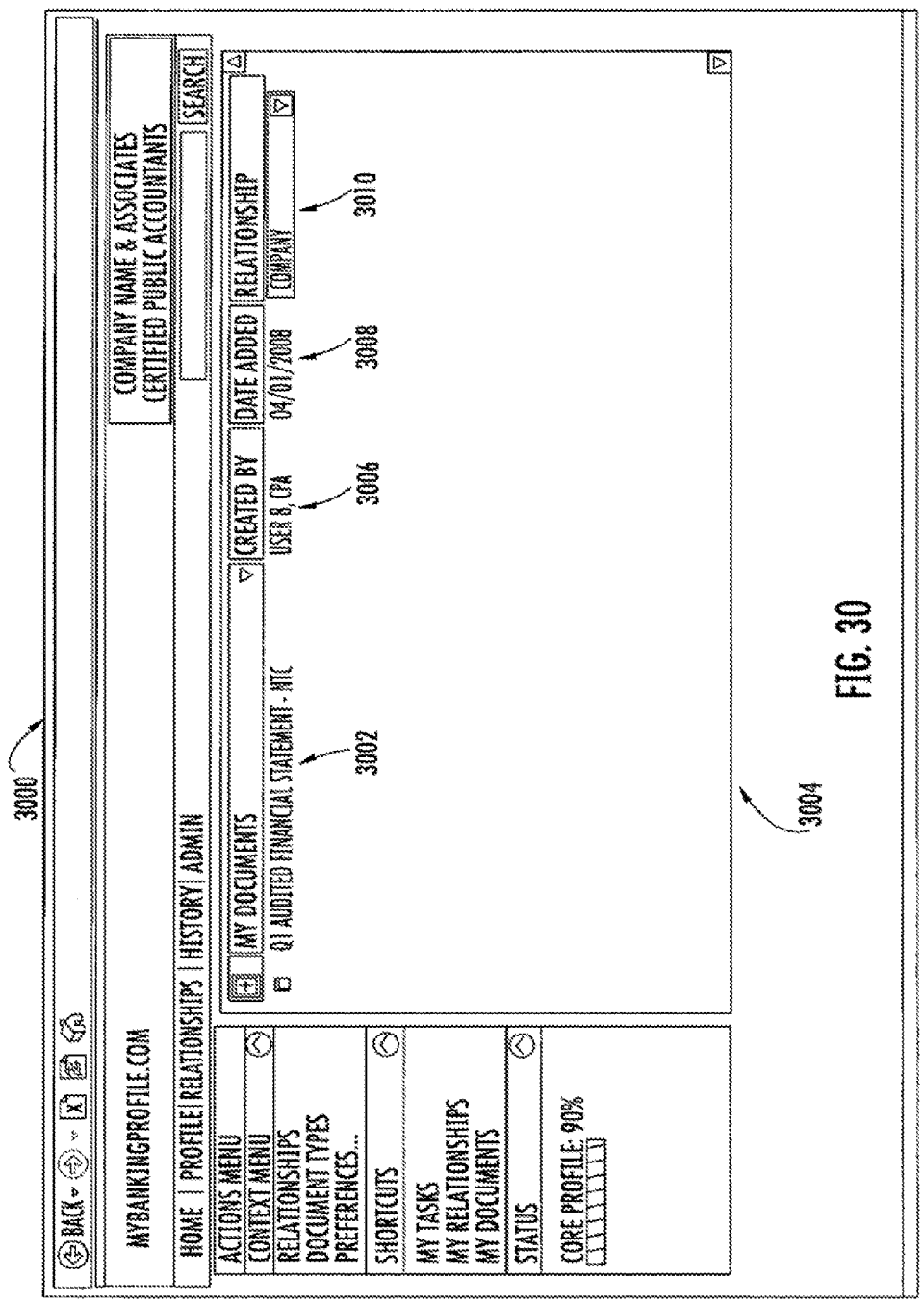
Figure 31:
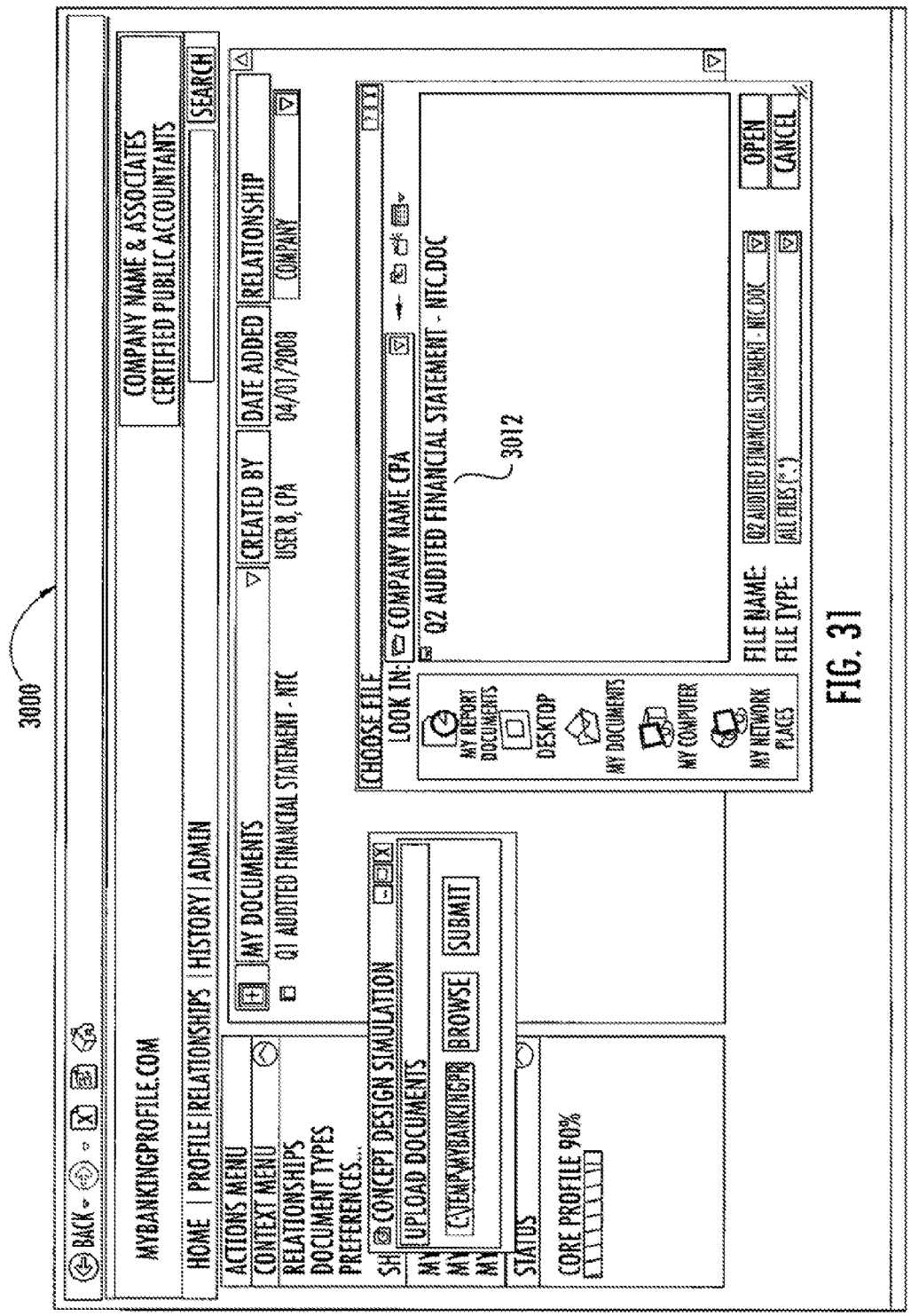

As understood, other third parties 118b-d associated with a transaction, such as lawyers, accountants, companies and other entities may also have access to various documents in a transaction for review and comment. In some embodiments, these entities 118b-d may upload additional documents needed for the transaction. For example in FIGS. 30 and 31, a third party 118b-d, such as an accountant may access and/or modify existing documents 3002 or upload additional documents 3102 needed for a transaction. These documents 3002, 3102 may be reflected in a specific document section 3004 of the interface 3000, as shown in FIGS. 30-31. The interface 3000 may provide the user with various information, such as who created the file 3006, when the file was added 3008, and the relationship to the user 3010. Other information may be added to the interface 3000, as desired by the user. As shown in FIG. 31, to upload one or more documents 3102, the user may select the file by browsing an electronic device or manually enter the location of the file. After uploading a document 3102, the document 3102 may be placed in a 'My Documents' section 3004 of the interface 3000 where the document 3102 may be shared with other third parties 118b-d as desired by the user.

Provided above are just a few examples of the various features and operations of the systems, methods, and computer program products of the present invention. It is understood that the systems and methods may be used to upload various documents and information, route the documents and information to various authorized users and/or make it available via an interface for viewing, facilitate the generation, routing, modification, authorization, and signature of documents associated with a transaction, etc. In addition to facilitating the flow of documents and information associated with a transaction, the systems, methods, and computer program products may also be used to provide post-transaction closing, possibly provide closing particulars and other information to third parties, etc.

The present invention can be implemented as a method, as a system, as computer instruction codes, as an apparatus and/or combinations of any of the above. Some of the claims of the application may be drafted in means-plus-function format. While the means recited in these claims can be implemented by any number of systems, devices, computer program code, etc., that may meet the functions outlined by the recited means.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for facilitating a transaction, comprising:
providing an e-vault system comprising a server and a storage system, the e-vault system being in electronic communication with a plurality of client systems comprising a first client system of a business merchant, a second client system of a first entity, and a third client system of a second entity;
receiving and storing in the storage system, a core business profile from the first client system, the core business profile comprising documents relating to the business merchant;
receiving and storing in the storage system, a first business relationship profile and a second business relationship profile from the first client system, the first business relationship profile comprising information relating to a business relationship between the business merchant and the first entity, the second business relationship profile comprising information relating to a second business relationship between the business merchant and the second entity;
granting a first access right to the second client, wherein the first access right enables the second client to access the core business profile and the first business relationship profile, wherein the second client is restricted from accessing the second business relationship profile;
granting a second access right to the third client; wherein the second access right enables the third client to access the core business profile and the second business relationship profile, wherein the third client is restricted from accessing the first business relationship profile; and
facilitating a business transaction involving the business merchant and the first or the second entity by:
receiving, via the e-vault system, from the business merchant, at least one business document for the business transaction, the at least one document comprising a first portion and a second portion, wherein the first portion of the at least one document is automatically populated with information based on information associated with the first or the second business relationship profile in the e-vault system;
accessing, via the e-vault system, by the first or the second entity the at least one business document having the first portion of the at least one business document automatically populated with information;
completing the business transaction by:

inputting information, by the first or the second entity, into the second portion of the at least one business document having the first portion automatically populated with information; and after inputting information into the second portion of the at least one business document, providing the at least one business document to the e-vault system.

2. The method of claim 1, wherein the plurality of client systems further comprise a fourth client system, and the method further comprises:

receiving and storing in the storage system, a third relationship profile from the first client system, the third relationship profile comprising information relating to a business relationship between the first client and the fourth client; and granting a third access right to the fourth client, wherein the third access right enables the third client to access the core profile, the first relationship profile, the second relationship profile, and the third relationship profile.

3. The method of claim 1, wherein the core profile comprises at least one of constitutional documents, financial statements, compliance certifications, tax forms, client reporting, investor information, and client ownership structure.

4. The method of claim 1, further comprising:
receiving and storing in the storage system, a profile for an individual associated with the first client; and
setting entitlements for the individual to authorize the individual to transact with one or more other clients via the e-vault system.

5. The method of claim 4, wherein the setting entitlements comprises setting authorization for at least one automated clearing house (ACH) transactions, wiring transactions, lockbox transactions, and RDS transactions.

6. The method of claim 4, wherein the setting entitlements comprises setting authorization for account administration with specific offices associated with the client.

7. The method of claim 4, further comprising removing the entitlements from the individual having current entitlements and applying the entitlements to another individual associated with the first client.

8. The method of claim 1, wherein the at least one document electronically sent to the user associated with another client comprises all of the documents that are required for completing the transaction and that require at least one of user input and electronic signature from the user.

9. The method of claim 1, further comprising sending at least one notification to the user to alert the user that the at least one document has been sent to the user to fill out.

10. The method of claim 9, wherein the status indicator presents a ratio of the amount of information required to complete each profile.

11. The method of claim 9, wherein the status indicator presents a ratio of the amount of new previously unentered information required to complete each profile.

12. The method of claim 1, further comprising presenting a status indicator for at least one of the core profile and each of the relationship profiles, each status indicator presenting the amount of information left to be entered to complete each respective profile.

13. The method of claim 1, further comprising creating a task profile indicating the number of outstanding tasks left for the user and presenting a status indicator for a task profile, the task profile status indicator presenting the amount of tasks left to be entered to complete each respective profile.

14. The method of claim 13, wherein initiating the at least one business transaction further comprises setting up at least one task via an interface, the at least one task being associated with at least one incomplete document.

15. The method of claim 1, wherein initiating the at least one business transaction comprises setting up a profile, the profile containing information required to complete the at least one business transaction.

16. The method of claim 15, wherein each of the at least one task comprises a status indicator.

17. A server having a non-transitory computer program embodied therein for facilitating a transaction, comprising:

instructions for providing an e-vault system comprising a server and a storage system, the e-vault system being in electronic communication with a plurality of client systems comprising a first client system of a business merchant, a second client system of a first entity, and a third client system of a second entity;

instructions for receiving and storing in the storage system, a core business profile from the first client system, the core business profile comprising documents relating to the business merchant;

instructions for receiving and storing in the storage system, a first business relationship profile and a second business relationship profile from the first client system, the first business relationship profile comprising information relating to a business relationship between the business merchant and the first entity, the second business relationship profile comprising information relating to a second business relationship between the business merchant and the second entity;

instructions for granting a first access right to the second client, wherein the first access right enables the second client to access the core business profile and the first business relationship profile, wherein the second client is restricted from accessing the second business relationship profile;

instructions for granting a second access right to the third client; wherein the second access right enables the third client to access the core business profile and the second business relationship profile, wherein the third client is restricted from accessing the first business relationship profile; and instructions for facilitating a business transaction involving the business merchant and the first or the second entity by:

receiving, via the e-vault system, from the business merchant, at least one business document for the business transaction, the at least one document comprising a first portion and a second portion, wherein the first portion of the at least one document is automatically populated with information based on information associated with the first or the second business relationship profile in the e-vault system;

accessing, via the e-vault system, by the first or the second entity the at least one business document having the first portion of the at least one business document automatically populated with information;

completing the business transaction by:

inputting information, by the first or the second entity, into the second portion of the at least one business document having the first portion automatically populated with information; and after inputting information into the second portion of the at least one business document, providing the at least one business document to the e-vault system.

18. The server of claim 17, wherein the plurality of client systems further comprise a fourth client system, and the server further comprises: instructions for receiving and storing in the storage system, a third relationship profile from the first client system, the third relationship profile comprising information relating to a business relationship between the first client and the fourth client; and instructions for granting a third access right to the fourth client, wherein the third access right enables the third client to access the core profile, the first relationship profile, the second relationship profile, and the third relationship profile.

19. The server of claim 17, wherein the core profile comprises at least one of constitutional documents, financial statements, compliance certifications, tax forms, client reporting, investor information, and client ownership structure.

20. The server of claim 19, wherein the instructions for setting entitlements comprises instructions for setting authorization for at least one automated clearing house (ACH) transactions, wiring transactions, lockbox transactions, and RDS transactions.

21. The server of claim 19, wherein the instructions for setting entitlements comprises instructions for setting authorization for account administration with specific offices associated with the client.

22. The server of claim 19, further comprising instructions for removing the entitlements from the individual having current entitlements and applying the entitlements to another individual associated with the first client.

23. The server of claim 17, further comprising: instructions for receiving and storing in the storage system, a profile for an individual associated with the first client; and instructions for setting entitlements for the individual to authorize the individual to transact with one or more other clients via the e-vault system.

24. The server of claim 17, wherein the at least one document electronically sent to the user associated with another client comprises all of the documents that are required for completing the transaction and that require at least one of user input and electronic signature from the user.

25. The server of claim 17, further comprising instructions for sending at least one notification to the user to alert the user that the at least one document has been sent to the user to fill out.

26. The server of claim 25, wherein the status indicator presents a ratio of the amount of information required to complete each profile.

27. The server of claim 25, wherein the status indicator presents a ratio of the amount of new previously unentered information required to complete each profile.

28. The server of claim 17, further comprising instructions for presenting a status indicator for at least one of the core profile and each of the relationship profiles, each status indicator presenting the amount of information left to be entered to complete each respective.

29. The server of claim 17, further comprising instructions for creating a task profile indicating the number of outstanding tasks left for the user and presenting a status indicator for a task profile, the task profile status indicator presenting the amount of tasks left to be entered to complete each respective profile.

30. The server of claim 17, wherein the instructions for initiating the at least one business transaction comprises setting up a profile, the profile containing information required to complete the at least one business transaction.

31. The server of claim 17, wherein instructions initiating the at least one business transaction further comprises setting up at least one task via an interface, the at least one task being associated with at least one incomplete document.

32. The server of claim 17, wherein each of the at least one task comprises a status indicator.

* * * * *

UNITED STATES PATENT AND TRADEMARK OFFICE
CERTIFICATE OF CORRECTION

PATENT NO. : 8,447,680 B2
APPLICATION NO. : 13/619455
DATED : May 21, 2013
INVENTOR(S) : Mayur Dhanji Chheda et al.

It is certified that error appears in the above-identified patent and that said Letters Patent is hereby corrected as shown below:

Title page, Item (75), change the first named inventor from "Mayur Dhanj Chheda, Charlotte, NC (US);" to -- Mayur Dhanji Chheda, Charlotte, NC (US); --

In the Claims:

Col. 24, line 17, change "...to complete each respective."; to
-- ...to complete each respective profile. --

Signed and Sealed this
Ninth Day of July, 2013

Teresa Stanek Rea
*Acting Director of the United States Patent and Trademark Office*